US006829424B1

(12) United States Patent
Finzel et al.

(10) Patent No.: US 6,829,424 B1
(45) Date of Patent: Dec. 7, 2004

(54) CABLE JOINT FOR OPTICAL FIBERS WITH SPLICING CASSETTES AND OVERLENGTH LOOPS

(75) Inventors: Lothar Finzel, Unterschleissheim (DE); Günter Schröder, Esting (DE); Heinz Diermeier, München (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 09/101,846

(22) PCT Filed: Dec. 5, 1996

(86) PCT No.: PCT/DE96/02331

§ 371 (c)(1),
(2), (4) Date: Jul. 17, 1998

(87) PCT Pub. No.: WO97/26574

PCT Pub. Date: Jul. 24, 1997

(30) Foreign Application Priority Data

| Jan. 17, 1996 | (DE) | 196 01 576 |
| Apr. 25, 1996 | (DE) | 196 16 597 |
| Jun. 12, 1996 | (DE) | 196 23 482 |
| Oct. 8, 1996 | (DE) | 196 41 442 |
| Oct. 8, 1996 | (DE) | 196 41 443 |

(51) Int. Cl.⁷ .............................................. G02B 6/00
(52) U.S. Cl. ........................................ 385/135; 385/147
(58) Field of Search .................................. 385/135, 134, 385/136, 147, 139, 138

(56) References Cited

U.S. PATENT DOCUMENTS

| 4,626,616 A | 12/1986 | Masters |
| 4,709,980 A | 12/1987 | Coll et al. |
| 4,744,622 A | 5/1988 | Cherry et al. |
| 4,790,626 A | * 12/1988 | Bonicel et al. ............. 385/135 |
| 5,283,853 A | * 2/1994 | Szegda ....................... 385/139 |
| 5,371,827 A | * 12/1994 | Szegda ....................... 385/136 |
| 5,695,224 A | * 12/1997 | Grenier ....................... 285/104 |

FOREIGN PATENT DOCUMENTS

| DE | 39 04 232 | 8/1990 |
| DE | 41 40 701 | 12/1992 |
| DE | 44 08 633 | 9/1995 |
| EP | 0 029 571 | 6/1981 |
| EP | 0 091 633 | 10/1983 |
| EP | 0 350 245 | 1/1990 |
| EP | 0 532 980 | 3/1993 |
| EP | 0 581 634 | 2/1994 |
| GB | 2 277 812 | 11/1994 |

OTHER PUBLICATIONS

K. Theys, E. Laeremans, "Splice case for optical fibre cable", WO 90/08336, Published Jul. 26, 1990.
Abstract of Japanese Published Application 63–005308 of Jan. 11, 1988, Patent Abstracts of Japan.
Abstract of Japanese Published Application 06–118253 of Apr. 28, 1994, Patent Abstracts of Japan.

* cited by examiner

*Primary Examiner*—Thong Nguyen
*Assistant Examiner*—Amel C. Lavarias

(57) ABSTRACT

The invention relates to a cable closure for optical-fiber cables, preferably optical-fiber minicables or optical-fiber microcables, with cable lead-in units, which are arranged perpendicularly with respect to the axis of the closure body, and it is possible for the closure to be fitted vertically into a core hole made into the earth or into road surfacings. On account of laid-in excess lengths of optical waveguide, splice organizers in the interior of the closure body can be taken out upwards for service work. Preferably, the excess lengths of optical waveguide are carried in a protective tube, which is deposited in a plurality of loops in the interior of the closure.

15 Claims, 18 Drawing Sheets

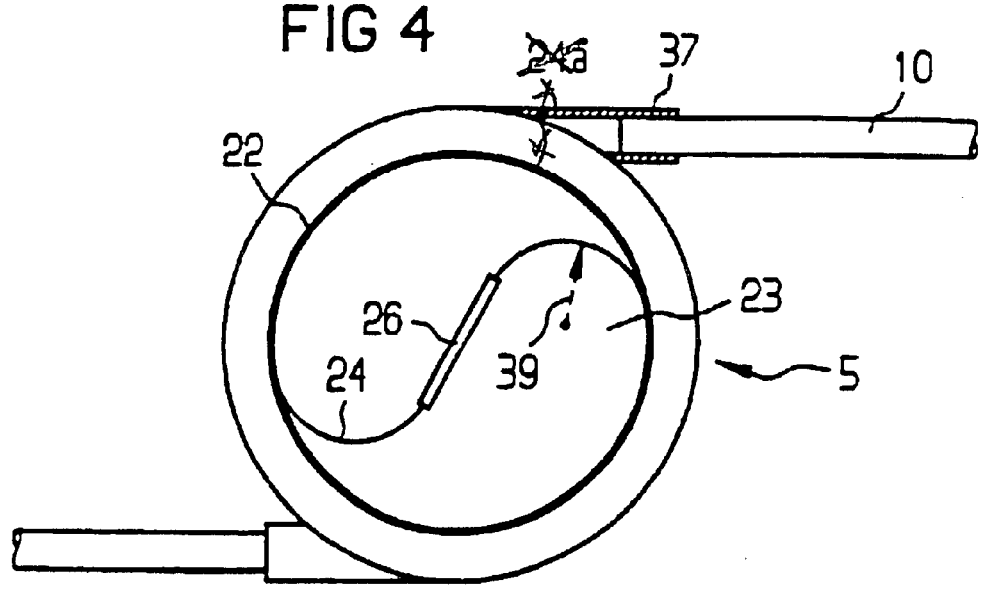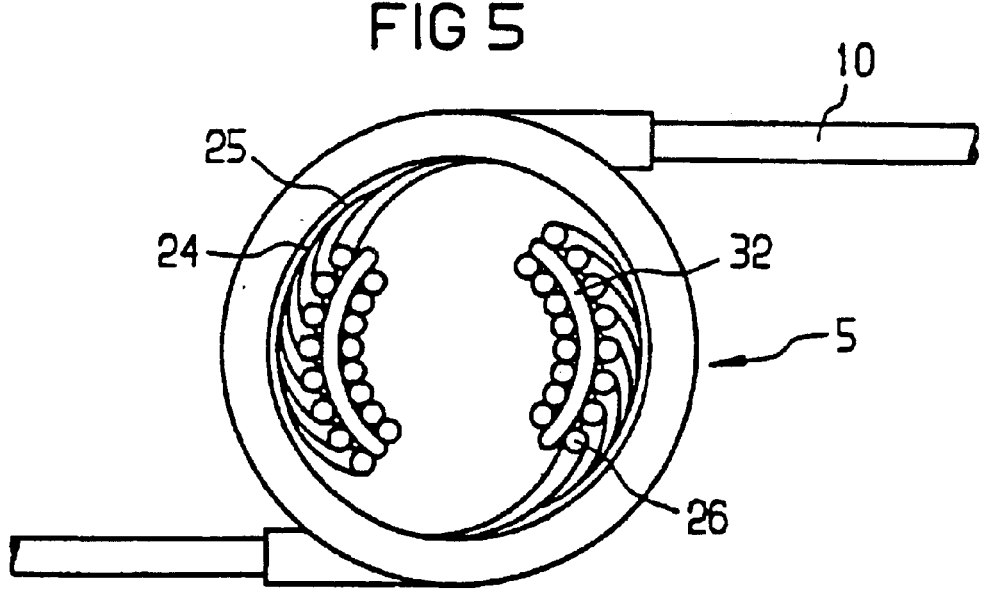

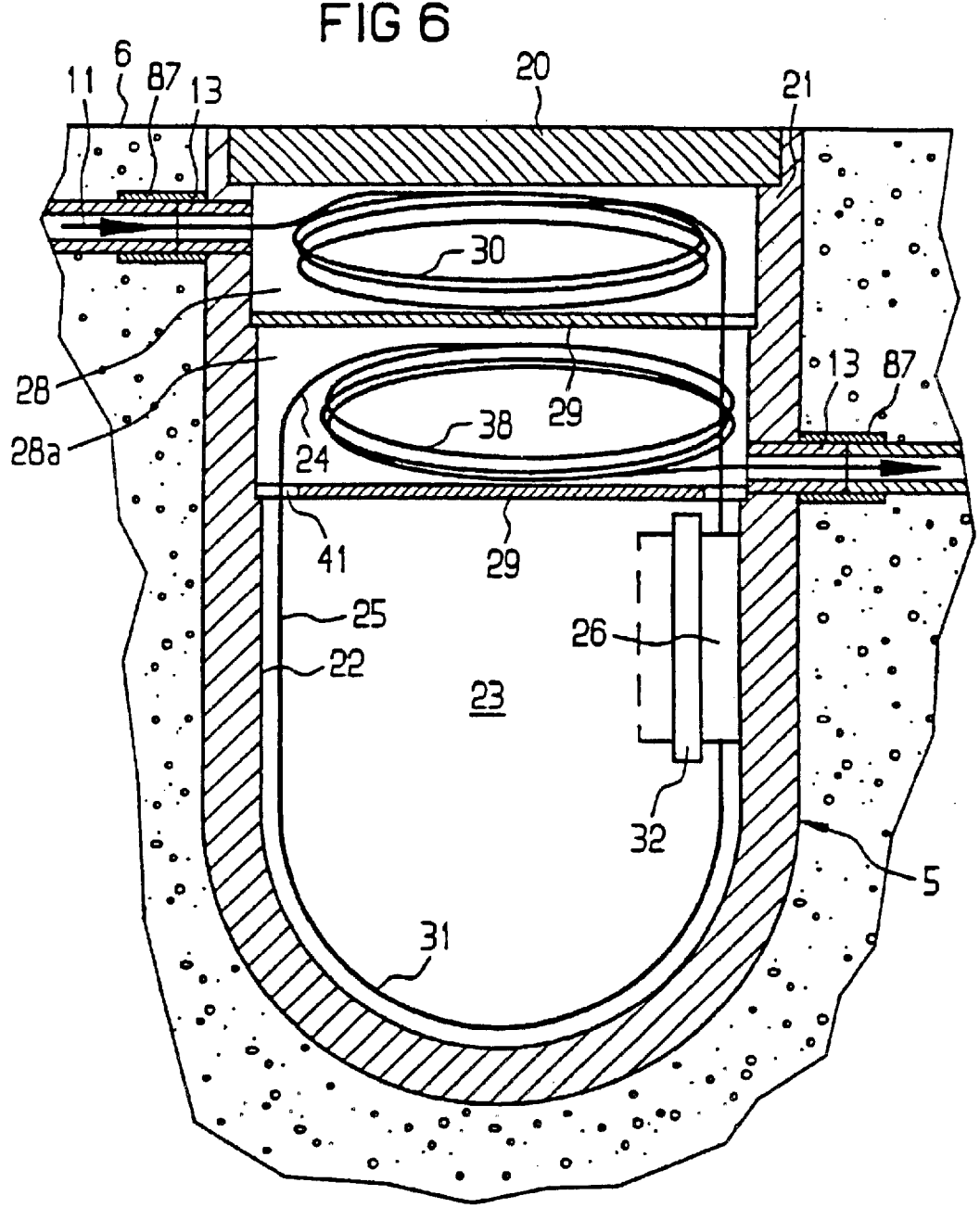

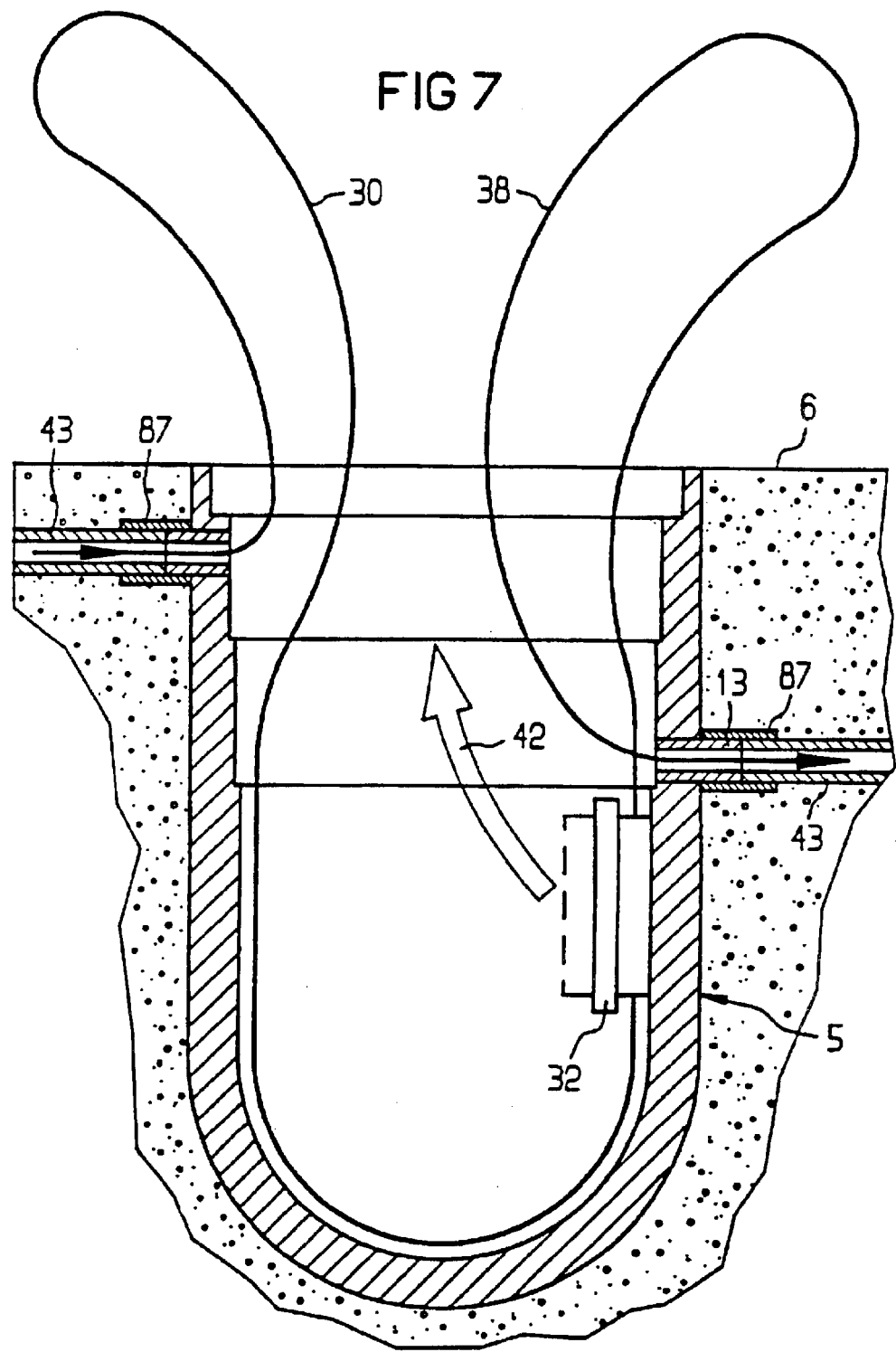

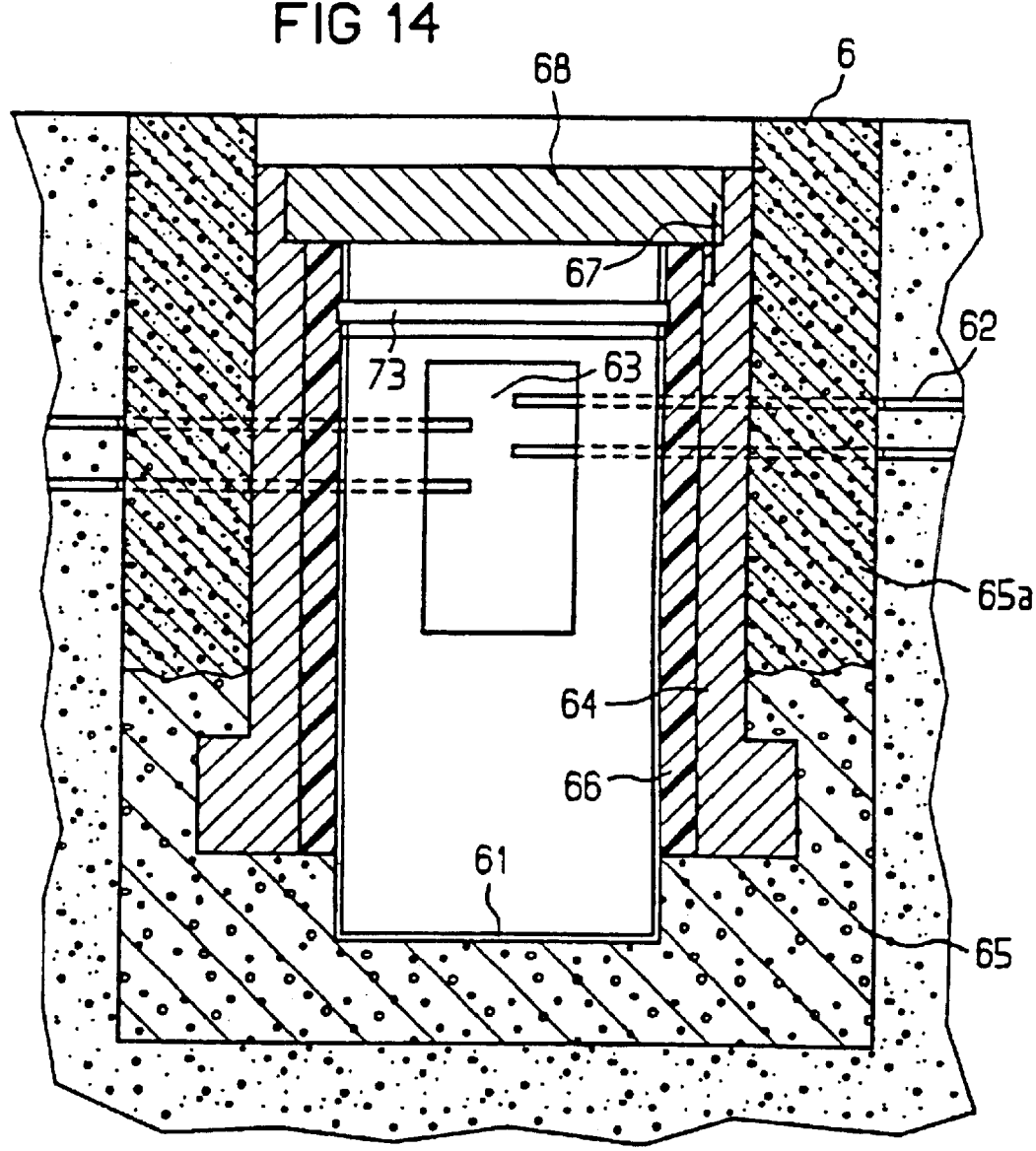

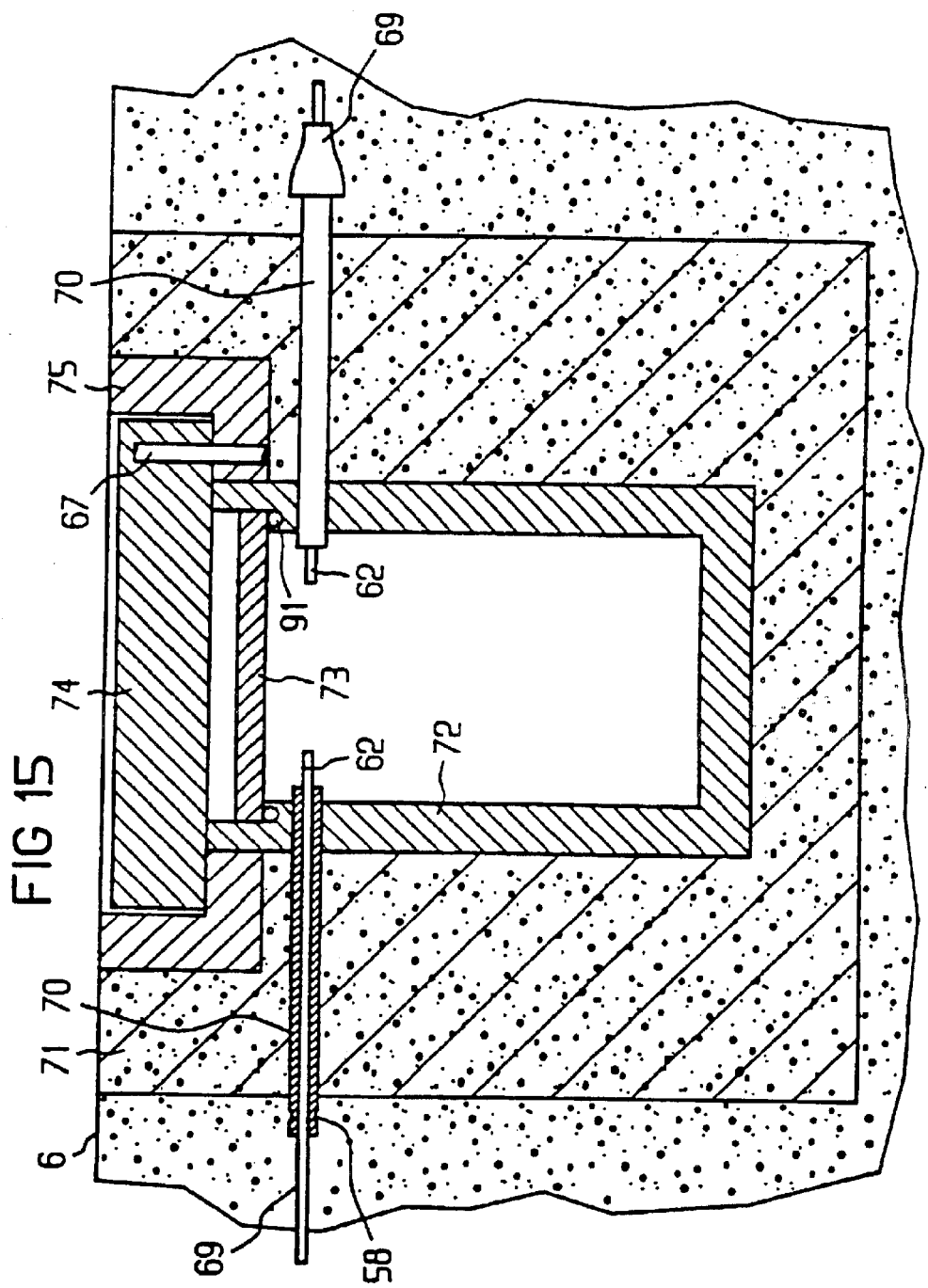

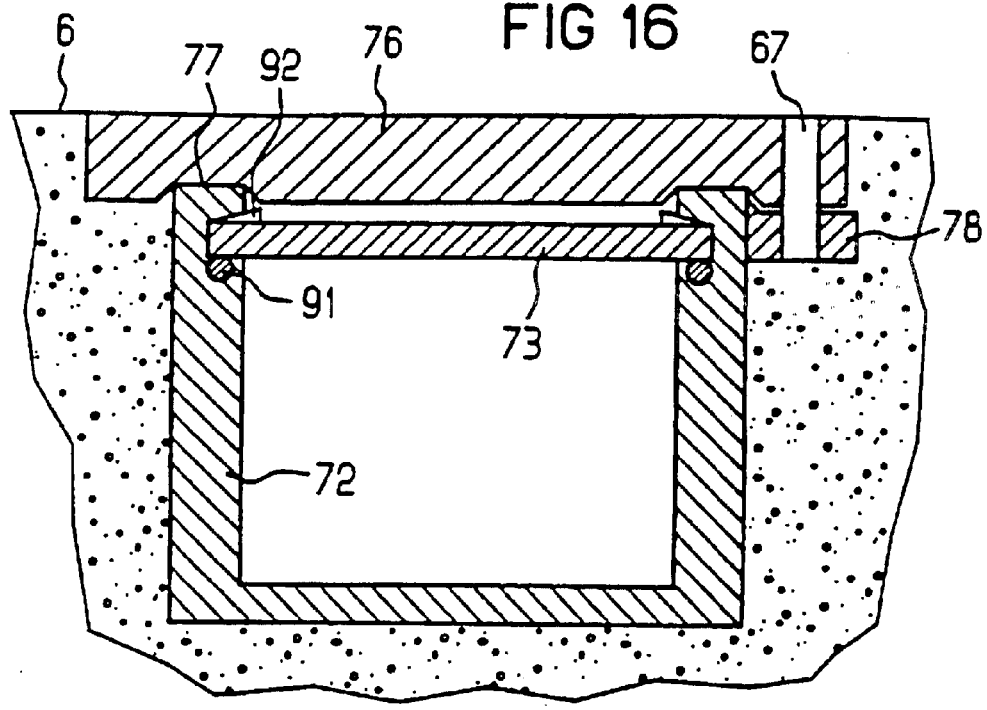
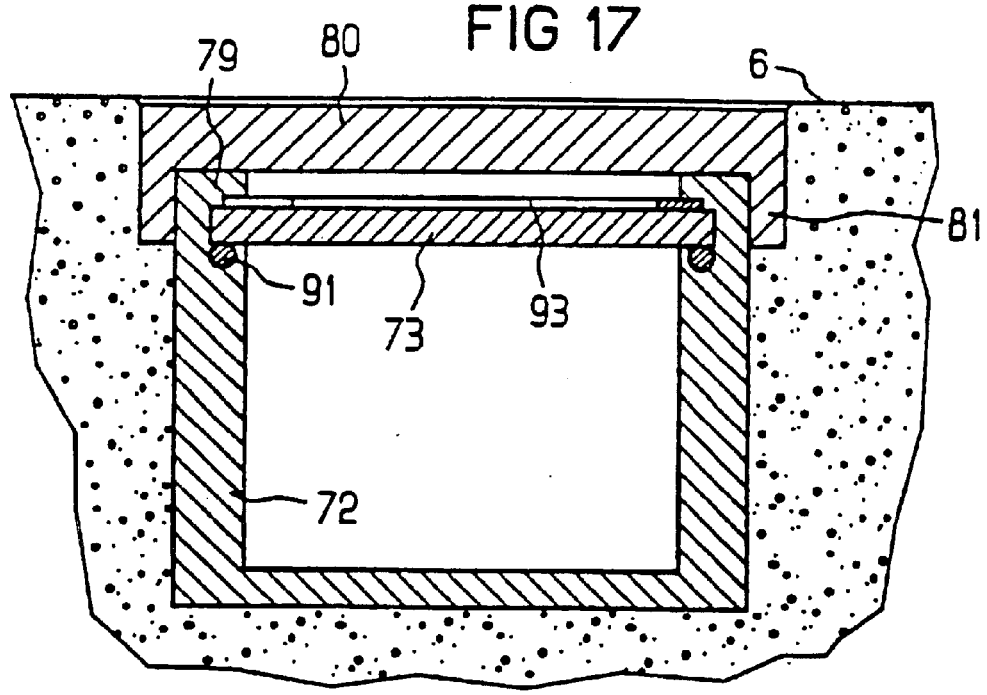

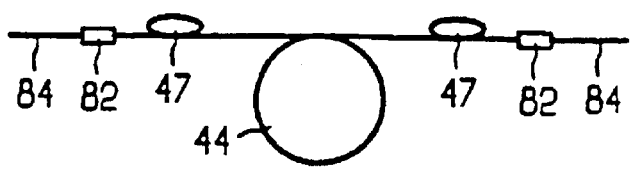
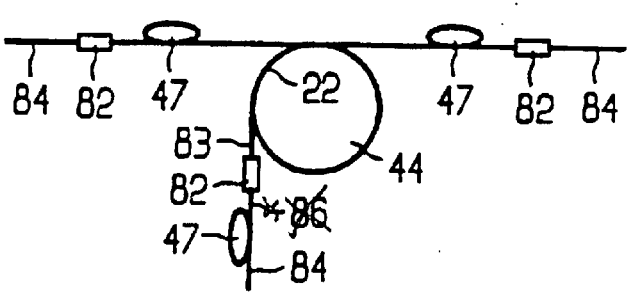
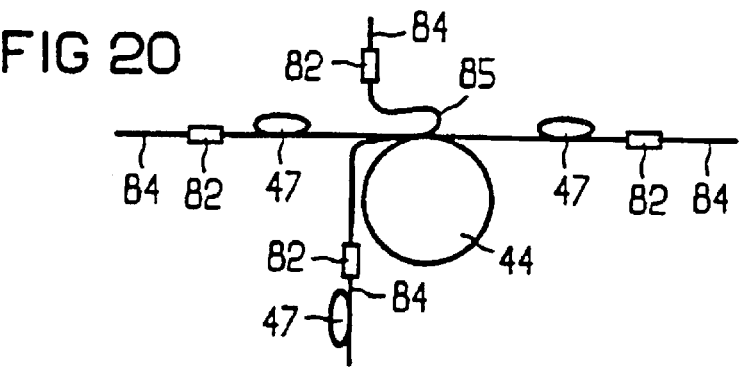
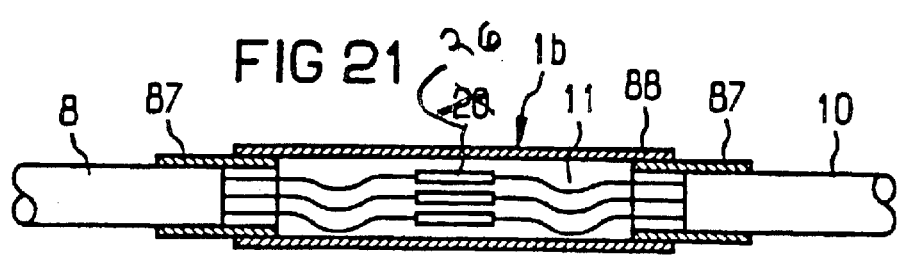

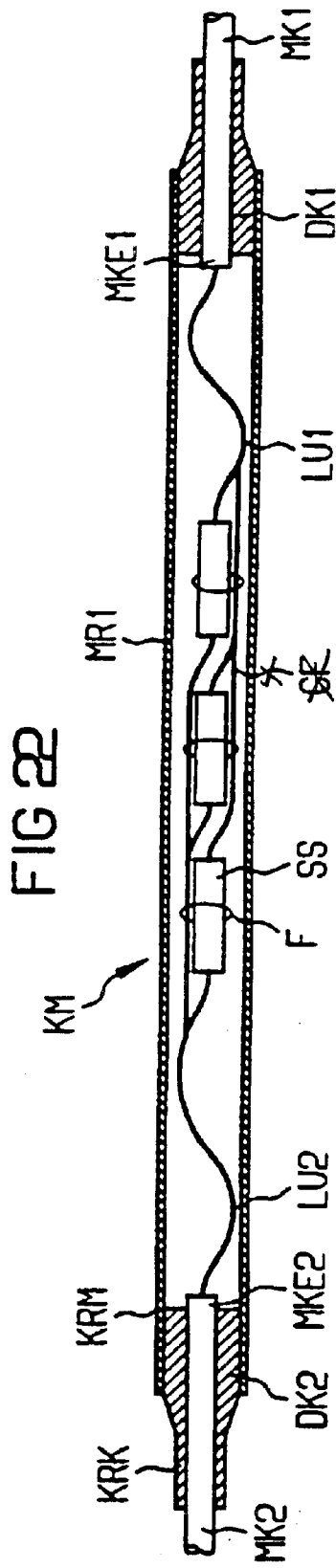

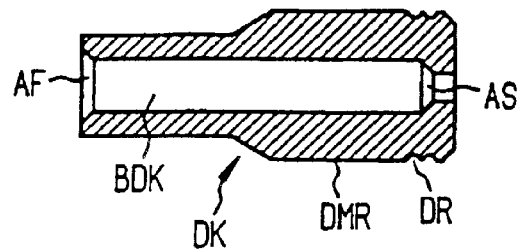
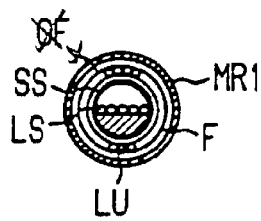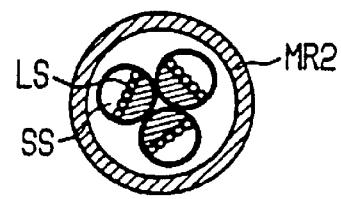
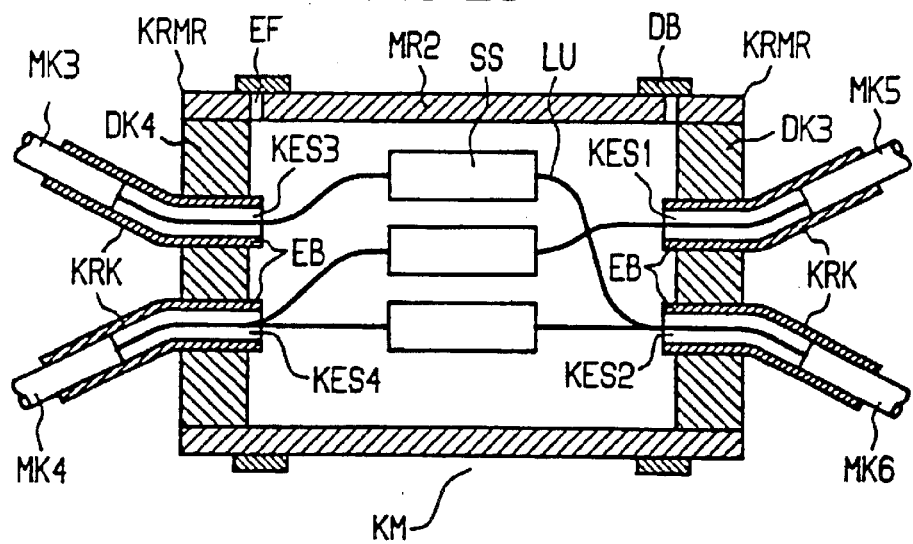

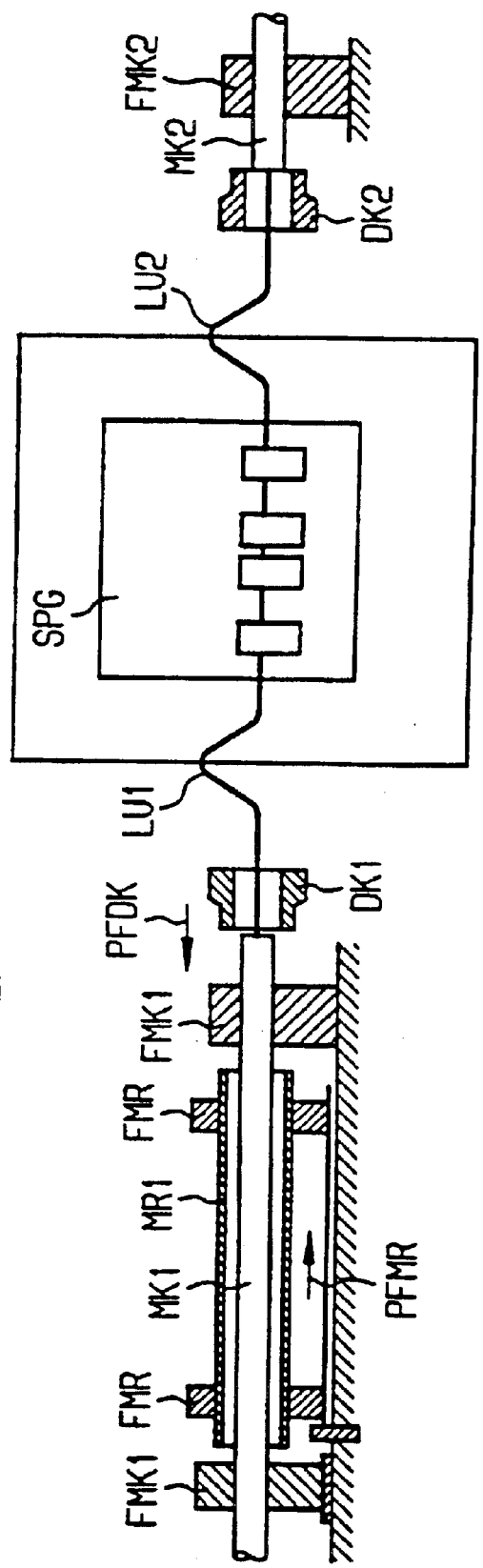

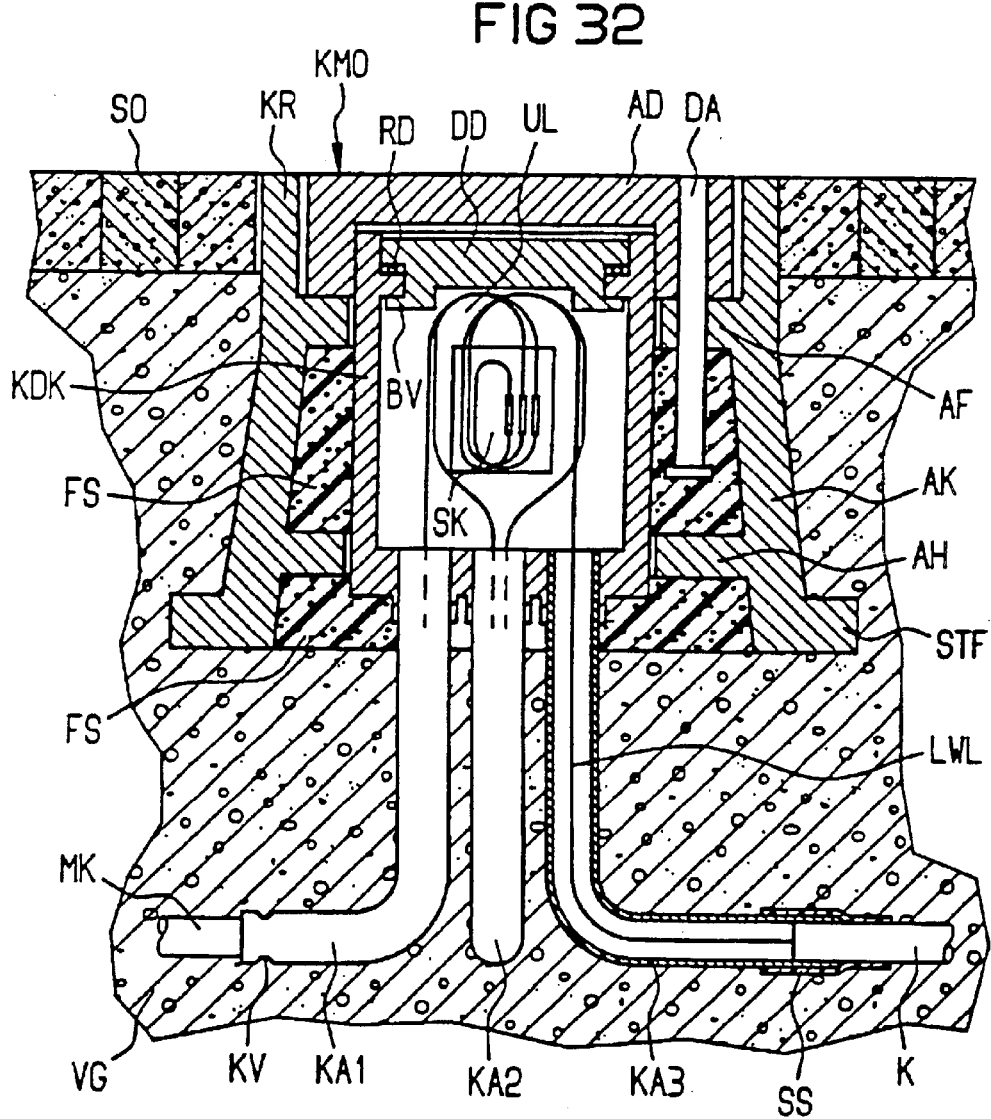

CABLE JOINT FOR OPTICAL FIBERS WITH SPLICING CASSETTES AND OVERLENGTH LOOPS

BACKGROUND OF THE INVENTION

The invention relates to an optical-fibre transmission system comprising a cable closure for optical waveguides with splice organizers and excess-length depositories for excess lengths of optical waveguide and comprises at least one optical-fibre cable, cable lead-in units in the form of cable lead-in spigots being arranged into the cable closure perpendicularly with respect to the axis of the closure body of the cable closure, the excess lengths of optical waveguide and the splice organizers being arranged within the closure body removably in the axial direction of the closure body, and at least one end face of the closure body being closed off in a sealing manner by an externally accessible cover.

DE 39 04 232-A1 discloses cross-connecting and branching accessories for communication cables and distribution networks, and the accessories have a branching junction box and at least one branch cable closure housed therein. The accessory has a hood closure with customary cable lead-in seals, and the cables led into the branching junction box are laid with excess lengths so that the hood closure can be taken out for service work. The cables are fed to the hood closure via separately laid cable ducts, and corresponding excess lengths of the cables are deposited in the cable junction box or manhole before they are led into the hood closures. For service work, the hood closures are lifted or swung out of their manhole position, so that the hood closure in then accessible and can be opened. However, such cable installations are designed for a normal laying method of freely layable cables.

U.S. Pat. No. 4,709,980 discloses a cable closure in which the cable lead-ins of the optical waveguides are arranged perpendicularly with respect to the axis of the cable closure. Contained therein are splice organizers, which can be removed upwards after opening a cover.

German Patent Specification 41 40 701 C1 discloses a cable closure as an underfloor container in which the cable lead-ins take place perpendicularly with respect to the cable closure axis, and the lead-ins are performed via lead-through flanges, so that the cables also have to be provided with corresponding units. Organizers which can be removed upwards are likewise included here.

EP-A-0 532 980 discloses a hood closure with lead-in spigots which, running in obliquely from below, are fitted into a base plate of the hood closure. Such a cable closure in designed for use in cable shafts and, if appropriate, for fastening to masts.

JP-04289451 describes a protective housing for a cable closure arranged in the ground. This protective housing comprises annular components which are arranged on a base. The closure is mounted therein on a frame and surrounded with filling material.

JP-61148782 describes a cable closure in which optical-fibre cables are led in axially. The cable closure comprises a lead housing and is designed such that organizer arrangements for excess lengths of optical waveguide can be arranged to lie therein. This cable closure is particularly suitable for use in cases where there are great temperature changes. The seals are established by welding.

SUMMARY OF THE INVENTION

The object of the invention is, however, to provide a cable closure for optical waveguides which is suitable for easy-to-lay minicables or microcables, and these minicables or microcables comprise pipes in which optical waveguides or optical waveguide bundles are loosely led in. The object set is achieved according to a first way with a cable closure of the type explained at the beginning by the cable lead-in units being designed as lead-in spigots in the form of pipes tightly fitted on, by the optical-fibre cables in the form of optical waveguide minicables or optical waveguide microcables, respectively comprising a pipe and optical waveguides, optical waveguide strips or optical waveguide bundles loosely introduced therein, being arranged in the cable lead-in units designed in terms of pipe connecting technology for receiving and sealing off the pipes of the optical-fibre cables, and the sealing connection of the pipe connecting technology being a welded, soldered or adhesively bonded connection between the pipe of the optical-fibre cable and the cable lead-in unit.

The object set is, however, also achieved according to a second and third way of forming the sealing connections by a press connection with a union nut, a plastic crimped connector or an elastic annular seal.

The new type of design of optical-fibre cables as minicables or microcables allows considerable advantages to be achieved in terms of laying technology. For instance, first and foremost there is a drastic reduction in costs, since the thin pipes of the optical-fibre cables can be laid in slits which are easy to make in the surface of the ground, so that a distinct reduction in the overall line costs for a new installation is possible. In addition, an increase in the operational reliability is possible by redundant routing, which is particularly suitable if a ring form of network structure is implemented.

For example, by using optical switches to connect up to existing networks, these easy-to-lay microcables allow flexible and intelligent networks to be built up in a simple way. Simple pigtail rings with optical switching can be used in this case, so that optical fibres can be used right up to the final subscriber. The great advantage is also that these simple microcables can be introduced at a later time into roads, pavements, kerb-stones, in the plinth region of walls of houses and special routes. In such cases it is possible to put into practice a technical concept adapted according to the wishes of the operator, allowing account to be taken of existing infrastructure with respect to rights of way, pipes for waste water, gas and district heating. The laying of the microcables is particularly easy to manage in this respect, since the pipe diameter of the microcables is only between 3.5 and 5.5 mm, so that a cutting width of 7 to 10 mm is adequate for the laying channel to be made. Such a laying channel can be accomplished with commercially available cutting machines, a, cutting depth of about 70 mm being quite sufficient. The pipe of such a minicable or microcable may consist of plastic, steel, chromium-nickel-molybdenum alloys, copper, copper alloys (brass, bronze, etc.), aluminium or similar materials. The cable closures according to the invention are preferably cylindrically designed and are fitted perpendicularly into a core hole cut out for this purpose and having a diameter corresponding to the cable closure, the core hole preferably being about 10 to 30 mm greater than the diameter of the cable closures. The closure height of the cable closure is about 200 mm, it preferably being designed in a pot shape and pointing with its end-face opening towards the surface, which opening can then be closed off in a pressure-watertight manner with the aid of a cover and a seal. The closure body itself is inserted for example by up to ⅔ of its height into a concrete bed and thereby receives adequate anchorage. The upper part of the core hole is then plugged with lean concrete, hot bitumen, two-component casting compound or expandable plastics materials. The closure cover may also be designed to withstand loading, but a separate covering with an additional manhole cover in also possible. It is consequently a pressure-water-tight cable closure which can be opened and reclosed at any time and has special cable lead-in units for minicables or microcables. The cross-connection excess length of the optical fibres or excess length of optical waveguides for subsequent splicing and all optical-fibre splices are accommodated in the closure body itself, these splices being mounted on a corresponding splice organizer. This splice organizer can be removed upwards in the axial direction of the cable closure, so that the closure itself can remain in its position. The optical waveguides are protected by a flexible tube, so that there is no risk of buckling during service work. For example, up to four tubular microcables may be led into the cable closure, the cable lead-in units for this purpose preferably being arranged on one side of the closure housing such that a tangential leading in of the optical waveguides along the inner wall of the closure is possible. The radius of the cable closure in this case corresponds at least to the minimum permissible bending radius of the optical waveguides, so that no additional protective devices have to be provided. The cable lead-in units comprise, for example, soft-metal tubes fitted in a sealtight manner into the wall of the closure, the ends of which tubes are plastically deformed by crimping on the led-in microcable ends such that a pressure-watertight seal is produced. In the case of such a pressure-watertight connection, the microcable with its pipe is additionally fixed adequately against tensile, compressive and torsional stresses. To be able to allow for tolerances in the laying of the microcable, the microcable is in each case provided with an elongation loop before it is led into the cable closure, so that as a result length compensation can take place. Such an elongation loop is provided before the cable closures or before bends in the microcable. Such an elongation loop may be additionally provided with a metallic protective tube, which allows only buckle-free bends, so that it is possible to dispense with further bending tools during installation. These length compensation loops for microcables also compensate for possibly occurring elongations or shrinkages of the cable, as well as settling in the road or in the earth. They likewise comprise readily bendable metal tubes, for example of copper, and can be made pliable by prior heat treatment in the bending region. It is also possible to make the tubes used for the length compensation loops, flexible by corresponding coiling. Metal tubes also accomplish stability against transverse compressive stress and ensure that minimum bending radii of the optical waveguides are maintained. In addition, the length compensation loops may already be prefabricated at the factory and consequently no longer need to be produced on site. During laying, the microcables may also be brought up to and fixed to the closure above ground, the length compensation loop then receiving the excess length of cable when the cable closure is lowered. Depending on the configuration and requirements, such an in-line or branch cable closure may be produced on site with T-shaped or else cross-shaped branches being possible.

To realize the invention, slender, elongate closures may be used, in particular if it is a case of lengthening and repairing a microcable. In the case of such in-line cable closures, adaptations of microcables of different diameters can also be performed. For example, such a cable closure may on one lead-in side have a microcable of a first diameter led into it in a sealing manner and on the second side of the cable closure be lengthened by a microcable of a second diameter, different from the first diameter. The adaptation to the different diameters may take place with the aid of lead-in elements of different diameters or with the aid of adapted adapter pieces or adapter pipes.

Particularly advantageous are, however, in this case, round, cylindrical closure bodies, the axis of which however runs perpendicularly with respect to the axis of the laying direction. In this way, the microcables may be led into the closure through tangentially arranged cable lead-in units. As a result, it is also possible to bring together in a single closure microcables from different laying depths. Within the closure, it is also possible for example to realize the splicing technique for uncut microcables, the excess lengths of fibre then expediently being deposited in a clearly arranged way in a plurality of loops one above the other within the closure.

In the case of such cable closures according to the invention, it is also of advantage that the cable lead-in units, and consequently the seals of the cables to be led in, are independent of the end-face
cylinder seal of the cable closure. In addition, each tubular microcable is individually sealed off and the cables lead-in units are preferably arranged in the middle or lower part of the cable closure, in order that no crossings of excess lengths of fibre or fibre run-ins occur. The storage space for the excess lengths of optical waveguide is preferably arranged directly underneath the cover, it being possible additionally to use separating plates, to be able, for example, to separate incoming optical waveguides from outgoing optical waveguides. In this way, the splicing space can also be divided off. When taking out the splices for service work, in each case the excess lengths of optical waveguide must always be taken out first, to allow splicing work to be performed. The splices may subsequently be accommodated vertically or horizontally in a splicing space, expediently being arranged on a splice organizer, an which excess lengths of optical waveguide may also be arranged in a clear manner.

The cable closure according to the invention may, also comprise a plurality of rings, which may be placed one above the other, depending on size requirements one against the other. The individual rings are then sealed off with respect to one another, for example by sealing measures which are normal and known per se. In the case of such a dividable cable closure, uncut cables may also be inserted if leading in takes place in this plane of intersection. This provides the possibility for application of the splicing technique.

This new technique thus gives rise to various special features. For instance, the cable closures according to the invention can be introduced into the road surfacing in a simple way in standard core holes, the composite structure of the carriageway surfacing not being destroyed by this core-hole drilling. The laying of the minicables or microcables and the associated closures may be performed in a simple way in any areas of the earth or of the road, preferably along a joint between the carriageways, introduced in channels or core holes. In the case of such a laying technique, the basic structure of the carriage way surfacing is not disturbed. Earth is not removed. Compaction of the earth is not required. Sinking of the repair site due to settlement in not to be expected. Cracking up or crack propagation is not to be expected. Laying in a laying channel made with customary cutting machines is a simple operation and closing is performed, for example, by pouring in hot bitumen or other fillers. The compact structural design and the relatively small diameter of the cable closure provide adequate load-bearing strength, the sealing of the round closure fastening not presenting any difficulties, since the cover seal is separate from the cable seals. So-called fibre handling and the fibre run-in may take place on a plurality of mutually separate levels, so that better utilization of the volume of the closure can be achieved. The radius of the inner wall of the closure is designed such that it supports the incoming optical waveguides, buckling not being possible.

Elongate cable closures for the connections technique with the microcables used are suitable in particular for through-connections or when lengthening microcables with different materials or different pipe diameters. It is possible, for example, even in domestic cable laying to connect to elongate closures so-called "blown fibre conductors".

Round, cylindrical closures are suitable in particular for changes in direction in the running of the cables, for cross-connecting, splicing, measuring, branching, dividing, overcoming differences in height in the case of laid microcables and for receiving optical switches and the electronics for the transmission technology.

Other advantages and features of the invention will be readily apparent from the following description of the preferred embodiments, the drawings and claims.

BRIEF DESCRIPTION OF THE DRAWINGS

FIG. 4 is a plan view of a cylindrical closure, FIG. 5 is a plan view of a cylindrical closure with a storage space for excess lengths of optical waveguide and depositing and fastening of the splices, FIG. 6 is a longitudinal cross-sectional view of a cylindrical closure, FIG. 7 is a longitudinal cross-sectional view of a cylindrical closure with pulled-out excess lengths of optical waveguides, FIG. 14 is a cross-sectional view of a cylindrical cable closure which has been fitted into the road surface, FIG. 15 is a cross-sectional view of a cylindrical cable closure, with a concrete protective housing, FIG. 16 is a cross-sectional view of a cable closure in a simple configuration, FIG. 17 is a cross-sectional view of an in-line closure which has been built into the road surface and the cover of which has a peripheral collar, FIG. 18 is a diagram of the arrangement of a closure for a through-connection, FIG. 19 diagrammatically shows an arrangement of the cable closure for a T-branch, FIG. 20 is a diagram of the arrangement for a cross shaped branch, FIG. 21 is a longitudinal cross-sectional view of an elongate cable closure with diameter adaptations in the form of tubular adapter pieces or adaptation sleeves, FIG. 22 is a longitudinal cross-sectional view of the cable closure according to the invention, FIG. 23 is a cross-sectional view of a sealing head, in cross-section, FIG. 24 is a transverse cross-sectional view of a splice arrangement in series, FIG. 25 is a transverse cross-sectional view of an arrangement of optical-fibre splices next to one another, FIG. 26 is a cross-sectional view of a distribution or branch cable closure, FIG. 27 is a cross-sectional view of an assembly device for the installation of the cable closure, FIG. 32 is a cross-sectional view of a cable closure which is accessible from above.

DESCRIPTION OF THE PREFERRED EMBODIMENTS

Figure 1:
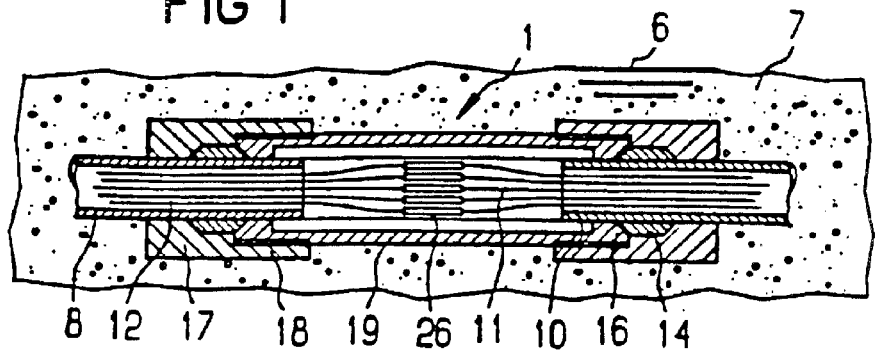
FIG. 1 is a longitudinal cross-sectional view of an elongate closure for microcables of the same diameters.

Represented in FIG. 1 is a slender, elongate cable closure according to the invention, by which a connection of tubular minicables or microcables is made possible. The minicables or microcables comprise in each case a pipe 8 or 10—here of the same diameter—in which the optical waveguides 11 are drawn in, blown in or laid in before the pipe joining process. Within the cable closure 1, the optical waveguides 11 are connected to one another by means of splices 26. The in-line cable closure 1 comprises a tubular middle part 19 with end-face ends 16, on which external threads are arranged. The lead-in pipes 8 or 10 of the minicables or microcables are led in in a sealing manner with the aid of sealing inserts 14 and/or cutting rings, and the necessary sealing pressure in the cable lead-in units is produced with the aid of over-engaging union nuts 17, which have an internal thread 18 in each case at their free ends. The complete cable closure 1 is sunk below the road surface 6 into the earth 7 or into cut-in laying channels. Since it constitutes high mechanical protection for splices 26, it may also be used above ground, for example on masonry plaster.

Figure 2:
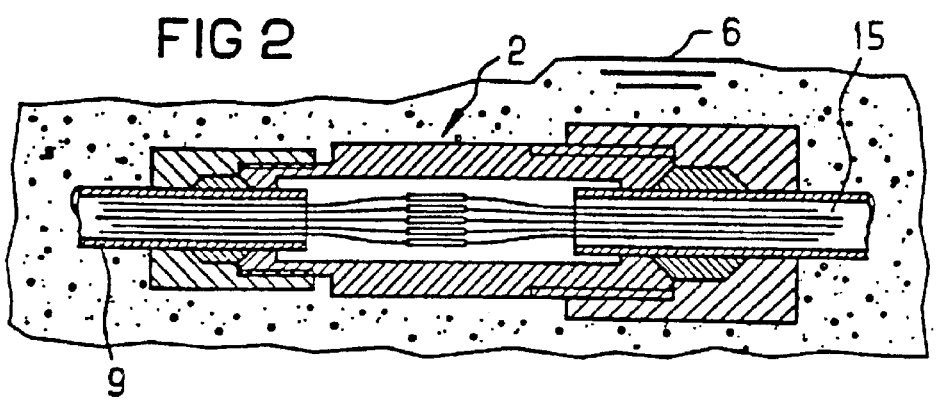
FIG. 2 is a longitudinal cross-sectional view of an elongate closure for microcables of different diameters.

Represented in FIG. 2 is an elongate in-line cable closure 2, in which microcables 9 and 15 of different diameters are connected to each other. In this case, the same connecting and sealing technique as in the case of the cable closure 1 according to FIG. 1 is used, and the only difference is that the lead-in diameters at the end faces of the cable closure are different and are adapted to the respectively led-in microcable 9 and 15, respectively.

Figure 3:
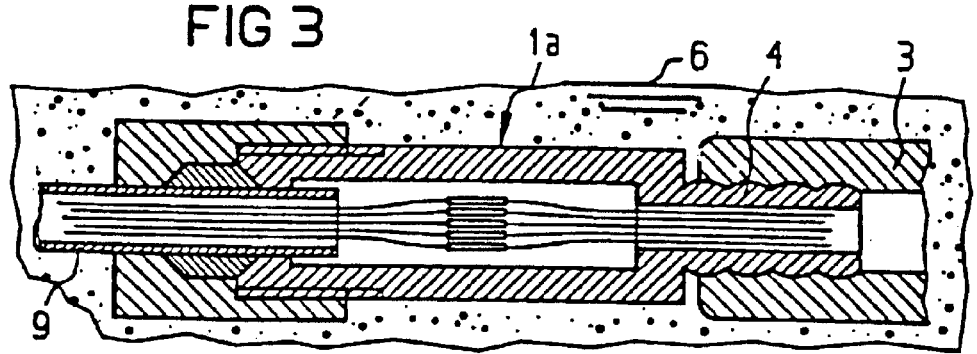
FIG. 3 is a longitudinal cross-sectional view of an elongate closure with a microcable fitted on one side.

Shown in FIG. 3 in an in-line cable closure 1a, the left-hand lead-in side of which corresponds to the exemplary embodiment according to FIG. 1, while the right-hand lead-in side has a profiled inlet spigot 4, onto which the continuing microcable 3 is fitted and is correspondingly sealed off. Th sealing may take place by adhesive bonding or crimping on of the microcable pipe on the lead-in spigot. This exemplary embodiment may be used in particular in the case of the "blown fibre" technique, in which optical waveguides are blown in at a later time in a laid hollow pipe. The hollow pipe 3 concerned, for example of plastic, can be readily fitted onto the lead-in spigot 4 of the cable closure 1a.

The exemplary embodiments shown in FIGS. 1 to 3 and 21 are suitable as straightforward in-line cable closures, in which there are no excess lengths of optical waveguides, so that they are used as straightforward repair and connection links between the minicables or microcables.

Represented in FIG. 4 is a round, cylindrical cable closure 5, which can, for example, be sunk vertically into a core hole in the earth or in the road structure. The cable lead-in units 37 are arranged tangentially at the wall of the closure so that the optical waveguides 24 of the fitted-on microcables 10 can be taken further along the inner wall 22 of the closure. In this way it is possible, for example, for the excess lengths of the optical waveguides to be deposited in an ordered way. For required splices 26, the optical waveguides 24 are taken out from the excess-length assembly and spliced. In doing so, it must be ensured that bending in the splice depository does not go below the permissible minimum bending radius 39 of the optical waveguides. The cylindrical interior space 23 of the cable closure 5 may be separated into appropriate compartments in a corresponding way for the individual functions, and the splices 26 are deposited in a horizontal plane in the case of this exemplary embodiment.

FIG. 5 shows an exemplary embodiment for a cylindrical closure 5, in which the optical waveguide splices 26 are arranged vertically in the cylindrical closure space. Used for this purpose in this case are, for example, sickle-shaped or arcuate segment splice organizers 32, which can be taken out vertically upwards for service work. The lead-in optical waveguides 24 are deflected by means of indicated guides 25 such that it is not possible for bending to go below the minimum permissible bending radii.

Represented in FIG. 6 is a cylindrical cable closure 5 for microcables, which is closed off towards the earth side in a hood shape and is accessible from the surface 6 via a cover 20. The cover 20 can withstand high loading and closes off the cable closure 5 pressure-watertightly by means of a sealing system 21. In the case of this embodiment shown, the cable lead-in unit 13 is housed in the upper part of the closure, to which the pipe 43 (FIG. 7) of the microcable is connected in a pressure-tight manner, with the aid of an adaptation sleeve 87. The optical waveguides 11 are led in through this cable lead-in unit 13 and deposited in excess lengths on a plurality of levels within the closure space. Here, the excess lengths 30 of the led-in optical waveguides are stored in the upper deck 28 and the excess lengths 38 of the outgoing optical waveguides are stored in the lower deck 28a. The lead-throughs 41 in the respective separating plates 29 make it possible for the optical waveguides to be led through from one level to the other. The lower region of the cable closure serves as splicing space 23, in which the splices 26 are fastened on removable splice organizers 32. If service or splicing work is necessary, after removal of the cover 20 the excess-length assemblies 30 and 38 are taken out, so that finally the splice organizers can be removed. The hood-shaped termination of the inner wall 22 of the cable closure 5 is curved such that it can serve as a guide for the optical waveguides 31 leading to the splices. The marking 25 is intended to indicate, that corresponding guides for optical waveguides or optical waveguide groups can also be used in the splicing space, allowing the clarity of the arrangement to be improved. The leading away of the optical waveguides into the connected pipe of the outgoing microcable takes place in turn via a cable lead-in unit 13, which is arranged here on the level of the storage space 28a for the outgoing optical waveguides 38. The sleeve-shaped cable lead-in units 13 are drawn here diagrammatically as crimpable lead-throughs, but according to the special configuration provided by the invention the may also be fitted on tangentially, so that here too the advantages described above come to bear.

In FIG. 7 it is shown how the removal of the individual units from the cable closure 5 according to FIG. 6 proceeds for service work. Thus, first of all the excess lengths 30 of the incoming optical waveguides and then the excess lengths 38 of the outgoing optical waveguides are removed upwards, so that access to the splicing space, and consequently to the splice organizers 32 located there, is then free. As the arrow 42 indicates, the splice organizers 32 can then be taken out upwards and be deposited in corresponding splicers.

Figure 8:
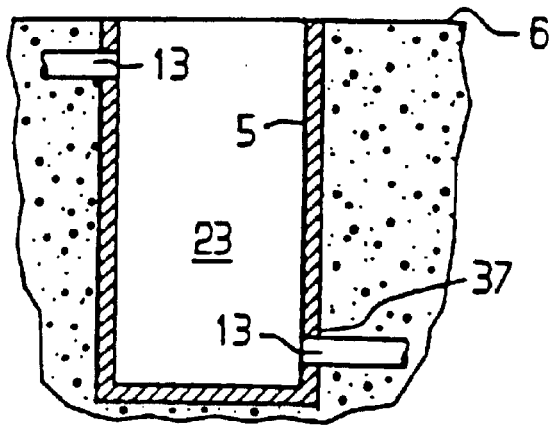
FIG. 8 is a cross-sectional view of a round closure with cable lead-in units at different levels.
Figure 9:
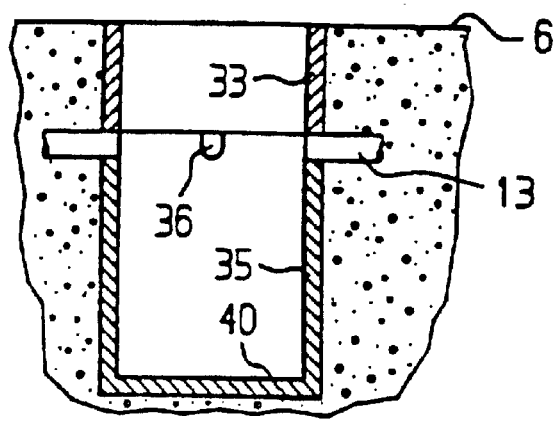
FIG. 9 is a cross-sectional view of a round closure, which is cut in the leading-in direction and is suitable for the splicing technique.
Figure 10:
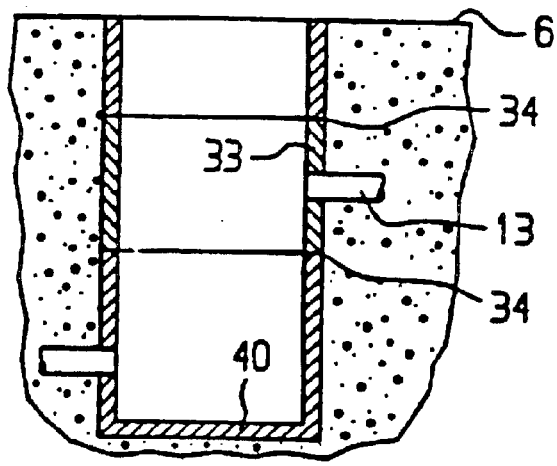
FIG. 10 is a cross-sectional view of an extendable round closure.

FIGS. 8 to 10 show basic units from which the cable closures according to the invention can be assembled. These basic units are let or placed into corresponding core holes in the earth or road surface 6.

Advantageous in this case is the cylindrical shape of the closure, which is closed off at one end by a flat base. As a result, under static loading from above, the forces are distributed evenly over a large surface area. Sinking into the road soil is not to be expected even when there in a high volume of traffic.

FIG. 8 shows a simple form of the cable closure 5, the cable lead-in units 13 being arranged at different levels. As a result, differences in height between the cable routes, as occur between road laying (about 7–15 cm) and earth laying (about 70 cm), can be overcome. This embodiment comprises a single housing of the interior space 23, which can be provided with the details described above. Th cable lead-in units 13 may be sealed off, for example, by sealing nipples, which are inserted at the point 37.

Presented in FIG. 9 is an exemplary embodiment which comprises a plurality of sections 33 and 35, which are arranged one above the other. Here, the cable lead-in units 13 and 36 are arranged in the separating plane between the two sections 33 and 35, so that it is possible also to lead in uncut microcables or uncut optical waveguide conductors. This makes it possible to apply the splicing technique here. In the case of a cable closure of cylindrical configuration, the sections 33 and 35 are individual rings which contain suitable sealing systems in the separating plane. A flat base 40 was chosen here as the termination.

FIG. 10 shows that a cylindrical cable closure can also be assembled, for example, from three individual sections or rings and it is possible by turning the individual sections to alter the direction of the cable lead-in units 13. Thus, for example, with such a cable closure a right-angled branch can also be realized. Here too, corresponding sealing systems are used in the separating planes 34 between the individual sections.

Figure 11:
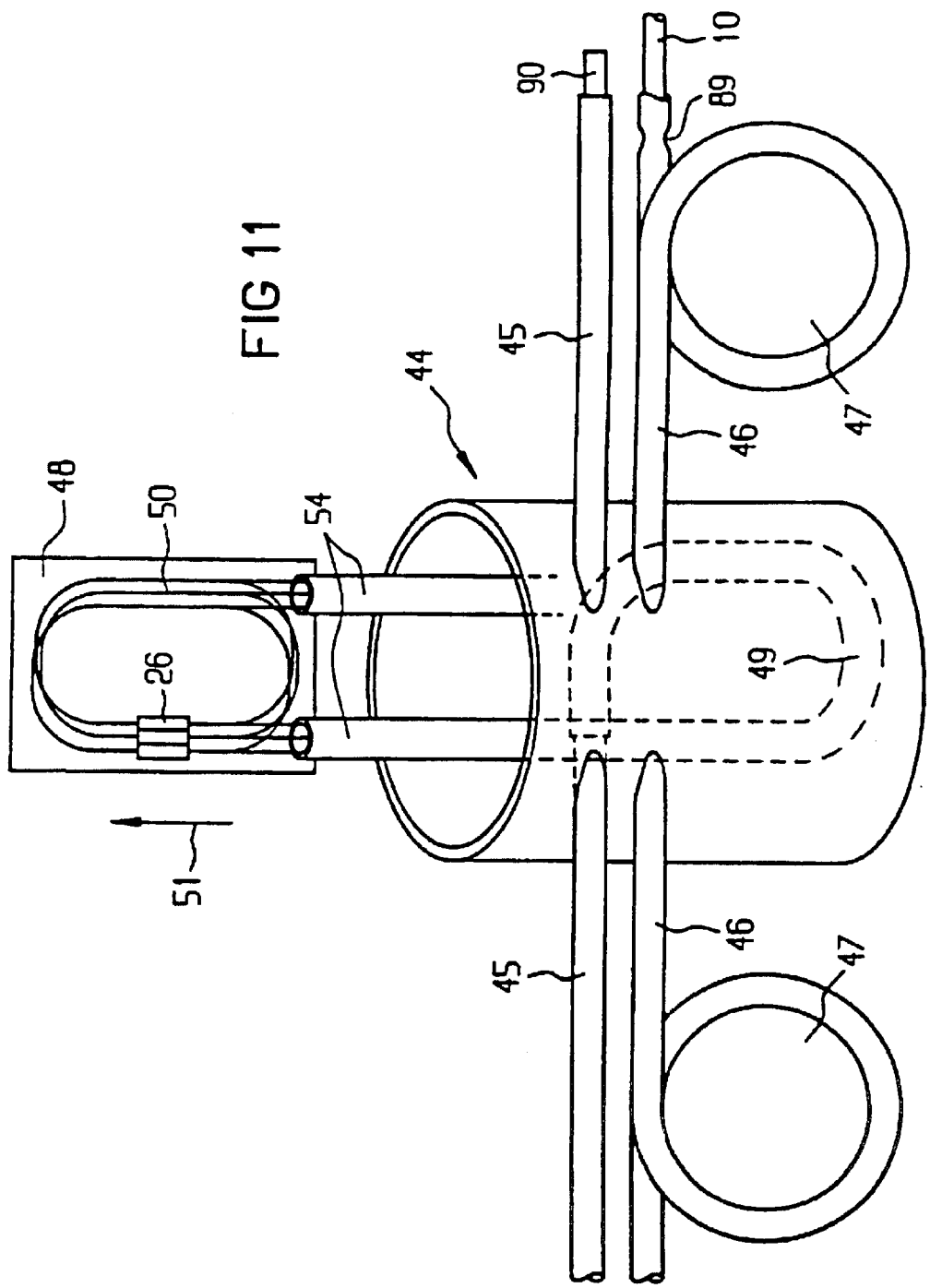
FIG. 11 shows a cylindrical closure with compensation loops and tangential cable lead-in units.

Shown in FIG. 11, likewise in a diagrammatic way, is the structural design of a cylindrical cable closure 44, in which the cable lead-in units 45 are led into the closure body tangentially in the form of tubular attachments. In this way, the optical waveguides can be continued in the interior of the cable closure along the inner wall of the closure without the risk of buckling. Furthermore, it is shown that the cable lead-in units 46, which in the case of this example are likewise led in tangentially, are provided with so-called compensation loops 47. These compensation loops 47 serve to compensate for tolerances during laying of the microcables and installation of the closures or else to compensate for longitudinal movements in the case of different coefficients of thermal expansion. The diameter of these compensation loops is dimensioned such that in any event bending does not go below the minimum permissible bending radius of the optical waveguides, and it has to be ensured that the compensation takes place without buckling under normal loading. It is also indicated in this diagram that, because of the excess lengths of optical waveguide 49, the splice organizer 48 with corresponding splice reserve 50 can be taken out from the closure in the service position in direction 51. In protective tubes 54, the optical waveguides are protected against mechanical loading inside and outside the closure and ensure buckle-free handling, without bending going below the minimum bending radius. The protective tubes 54 lead the optical waveguides from the cable lead-in unit 45, 46 up to the splice organizer 48. The depositing of the cross-connection excess length 49 in the interior space of the closure in the closed state is indicated by dashed lines. The connection to the microcables at the cable lead-in units 45 and 46 is explained in more detail below. At the top right, an unused cable lead-in 45 is sealed off by a dummy plug 90. At the bottom right of the figure, a crimped connection 89 with respect to the microcable 10 has been shown in principle.

Figure 12:
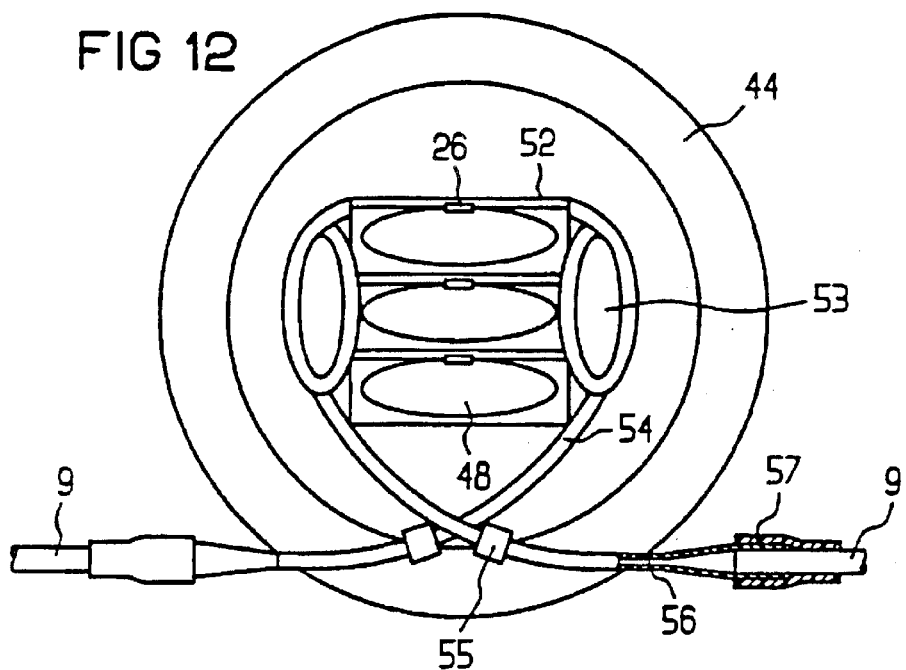
FIG. 12 is a top plan view of a round cable closure with protective tubes for the optical waveguides.

In FIG. 12, a cylindrical cable closure 44 is sketched in a view from above, in which the cable lead-in units comprise microcable lead-throughs 56, through which the optical waveguides are led into the interior of the cable closure. The lead-ins are in this case arranged virtually tangentially with respect to the inner wall of the housing, the free, outwardly pointing end being expanded in the shape of a nozzle in this representation, in order to be able to thread the optical waveguides into the flexible protective tube 54. These protective tubes 54 are connected by fittings 55 onto the inner ends of the cable lead-in units 56. For connection of the pipes 9 of the microcables, usually a crimp sleeve is used. Likewise, however, as shown here, a shrink tube piece 57 may also be used. The optical waveguides of the microcables are fed to the individual regions, for example the splice organizers 48, through the cable lead-in units and through the flexible protective tubes 54 via compensation loops 53. The transition may take place with the so-called maxibundle adapter. Consequently, if required, optical waveguides may be divided between a plurality of protective pipes. There is also the possibility of dividing the optical waveguides within the splice organizers 52 between a plurality of organizers 48. For this purpose, the optical waveguides are led through the bottom of the organizers 48.

Figure 13:
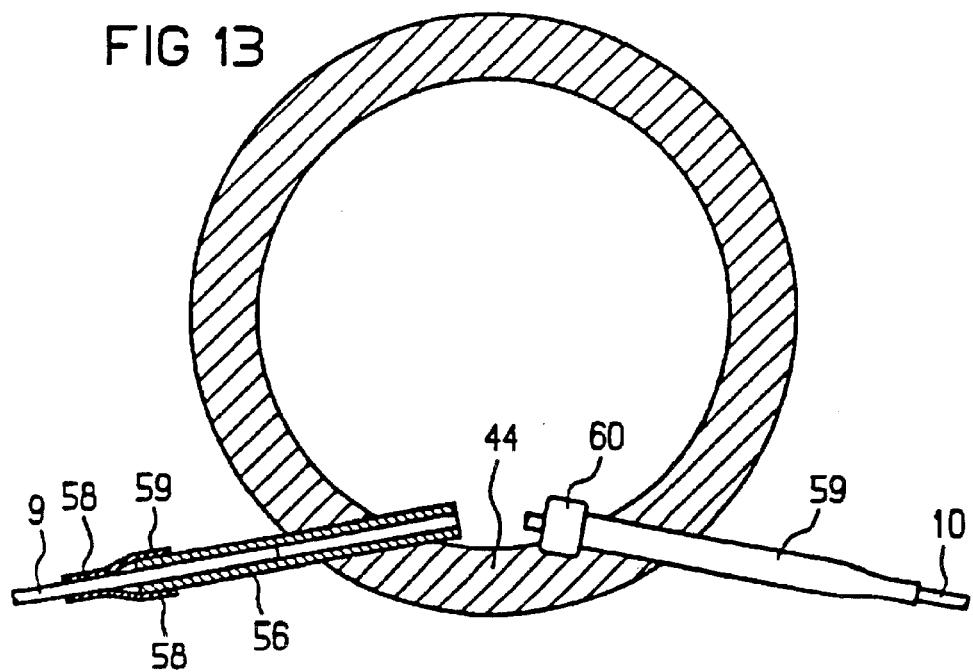
FIG. 13 is a cross-sectional view of a round closure with microcables pushed into the interior of the closure.

FIG. 13 shows in a diagram an in-line cable closure built into the road surface, in a view from above. In this way, the individual microcables 9 can also be pushed into the interior of the closure. The tension relief and the sealing likewise take place by crimping at the points 58. It is also possible to use, however, as shown here in the left-hand half of the figure, an additional shrink tube 59 or a permanently elastic annular seal, with the aid of which the sealing with respect to the cable lead-in unit 56 takes place. Furthermore, sealing could also take place in the interior of the cable closure 44, at the end of the lead-through, with corresponding sealing means 60. Suitable for this purpose is, for example, an annular lip seal 60, which is shown in principle as a shaft-sealing ring in the right-hand half of the figure.

Shown in FIG. 14 is an in-line cable closure 61 which is built into the road surface 6 and is fitted in a metallic protective housing 64 such that it is protected against mechanical loads. A cast iron cover 68 is captively fastened by a pivot bolt 67 to the protective housing 64. The protective housing 64 has an opening 63 in the wall for leading in the microcables 62. The protective housing 64 is embedded in concrete 65, which is in a lower region of the core hole which is formed in the road surface 6, in order to prevent sinking. The remaining annular gap is closed with hot bitumen or 2-component casting compound 65a. The cover 68 is slightly counter-sunk with respect to the carriageway surfacing and is accessible at any time for service work. The sealing cover 73 is described further below. The protective housing 64 and the cable closure 61 are arranged concentrically with respect to each other, it being possible for the intermediate space to be provided with a flexible foam filling 66.

FIG. 15 illustrates a sketch of an in-line cable closure built into the road surface 6 and having a concrete protective housing 71, which protects the in-line cable closure against mechanical loads. Such a protective housing of precast concrete is suitable in particular for sinking into a paved road surface. Here too, a cover 74 which can withstand high loads is provided, which cover is let into a ring 75. Here too, a pivot bolt 67 is provided. The cable lead-in units 70 are not flexible here and, because of the microcables 62, have to be led into the cable closure 72 rectilinearly. The cable sealing takes place outside the concrete protective housing 71 by crimping 58 (left-hand side) or with the aid of a shrink tube piece 69 (right-hand side). Any compensation loops must be situated outside the concrete protective housing 71 and are not shown here. The cable closure 72 is closed upwardly, underneath the load-withstanding cover 74, by a sealing cover 73. The latter seals off the closure space downwardly by an O-ring 91. In this diagram, the sealing cover 73 is secured and fixed, for example, by an annular screw.

FIG. 16 illustrates in a diagram an in-line cable closure 72 built into the road surface 6, and this is a simple mechanical cable closure for microcables. For reasons of overall clarity, the cable lead-in units already explained above have not been shown. The cast cover 76 absorbs the mechanical loads and leads them directly into the closure housing 72. The cast cover 76 is provided with a centering groove 77, which ensures non-slip support. For the guidance of the cast cover 76, hinged devices 67 and 78 are provided at the sides, by which devices adequate, positioning is ensured. The cable closure 72 is in turn separately sealed off upwards, underneath the cast cover 76, by a sealtight cover 73. The sealing takes place, for example, by an O-ring 91. The cover 73 is fixed in this diagram by securing wedges or securing pins 92, which provide adequate cover-pressing onto the O-ring.

Shown in FIG. 17 is a cable closure 72, which corresponds to that from FIG. 16, the load-bearing cover 80 here having a peripheral collar 81. By this peripheral collar 81, the cast cover 80 is fixed adequately against shifting on the peripheral wall 79 of the cable closure 72. The cover 73 is in this case fixed by a snap ring (Seeger circlip), which locks into an annular groove. Opening takes place by means of special pliers. The closure is secured against unauthorized access.

FIG. 18 illustrates in a diagram the conditions in the case of a through-connection of microcables 84, which are connected via connection units 82 and compensation loops 47 to the cable lead-in units of the cable closures 44. To reduce the variety of types, the closures are provided, as standard as far as possible, with 4 cable lead-in units. If not all the cable lead-ins are required, unoccupied cable lead-ins can be closed off pressure-watertightly by dummy plugs.

FIG. 19, on the other hand, illustrates the principle in the case of a T-branch of microcables 84. Here, likewise two of the microcables 84 are led into the cable closure 44 in the way described above, a further microcable 84 being led out, perpendicularly with respect to this first routing, tangentially from the cable closure 44. In this case, the branched-off microcable 84 is led in via a cable lead-in unit 83 directly without a compensation loop. The compensation loop 47 has in this case been provided on the cable end of the microcable 84. Unused cable lead-ins are closed pressure-water tightly by a dummy plug.

Sketched in FIG. 20 is a cross-shaped branch, in which the basic principles shown in FIGS. 18 and 19 are applied. In this case, it may be expedient for the compensation loops for the branching-off microcables 84 to be pulled up in a bow shape, as is indicated at the point 85. Compensation loops 47 are provided directly at the microcable ends.

It can be seen from the diagrammatically illustrated basic principles in FIGS. 18, 19 and 20 that a cylindrical cable closure according to the invention is particularly advantageous for the laying of minicables or microcables. On account of the possibility of tangentially leading in the relatively rigid pipes of the microcables, changes in direction in the routing can be arranged without any problems.

Depicted in FIG. 21 is a variant of the slender in-line cable closure 1b. In the case of this closure, the led-in pipes 8 and 10 are permanently fixed by plastic crimping of a softer metal. For this purpose, adapter pieces 87 of soft metal are crimped onto the pipe ends pressure-watertightly and permanently. An outer pipe 88, which is crimped onto the adapter pieces 87 at both ends, protects the splices 26. The inner bore of the adapter pieces 87 can be matched to the external diameter of the respective microcable 8 or 10.

The compensation loops 47 may be provided both at the cable lead-ins or cable lead-in units and directly at the ends of the microcables.

The cable lead-in units of the cable closure may also be designed as flange units, plug units inserted in a sealtight manner being provided for the connections of the optical waveguides. The optical waveguides are likewise provided with plug units, so that connection without any problems can take place, the ends of the minicables or microcables being provided with adapted flange units for sealtight coupling.

Furthermore, the complete cable closure, comprising closure body, cover, splice organizer, protective tube for excess lengths of optical waveguides, cable lead-in units, sealing systems, crimp connections and compensation loops, may be prefabricated in the factory.

A development of the invention is based on the object of providing slender in-line or vault cable closures for microcables, the diameter of which closures is only slightly greater than the diameter of the microcable and in which closure the microcable inlets can be sealed off by simple sealing methods. The object set is achieved with a cable closure of the type explained at the beginning by sealing heads of deformable material, preferably of a metal, being crimped onto the pipes of the optical-fibre cables in a sealing manner at peripheral crimping points, by the closure pipe likewise consisting of deformable material, preferably of a metal, and being crimped on at its end faces onto the sealing heads at peripheral crimping points and by the closure pipe being dimensioned in length such that adequate excess lengths of optical waveguide can be arranged in waveform extent and optical-fibre splices can be arranged.

It is furthermore the object of a development of the invention that, with such an in-line or vault cable closure, a sealtight splice connection is produced.

The slender in-line cable closure according to the invention for the microcables described essentially comprise a two sealing heads and a closure pipe. The sealing heads are interchangeably graduated and optimized in their internal diameter for the different microcable diameters. The connection between the sealing heads and the end of the pipe of the microcable takes place by a crimping operation. In this operation, the soft material, in particular metal, of the concentric sealing head is permanently deformed and pressed onto the pipe of the microcable in a sealtight manner. To increase the sealing effect, the sealing heads may be provided with peripheral grooves in the crimping regions. The same effect can also be achieved if a plurality of crimpings are carried out in series one behind the other. Within the cable closure, thus a plurality of splices may be deposited together in one multi-fibre shrink splice protector. By exposure to heat, a sealing of the splices is created. For splicing, multi-fibre splicers known per se may be used, such as for example the splicer X120 from the RXS company. However, conventional thermal splicers may also be used for individual fibres, for example the device X75 from the RXS company. To avoid crossovers and loopings of the splices in the splice protector, the individual optical waveguides must be fixed on both sides of the splice protector by an adhesive tape. Preferably, a parallel alignment of the individual optical waveguides and their fastening takes place in a planar mounting for optical waveguides, such as are known perese. Finally, all the splices are to be sealed together with a splice protector. In cases of few fibres, a plurality of crimping splice protection parts may be used instead of the multi-fibre splice protector. The splices may be arranged in series one behind the other or else next to one another in the cable closure. In order that the closure pipe can be pushed over the splices without damaging the optical waveguides, the optical waveguides must be brought up to the splices, so that fastening to the splices is recommendable. The splicing operation is expediently performed on a workbench, on which the optical waveguide ends to be spliced are clamped in dividable fastenings. After the splicing operation, the splicer is removed again, for example lowered into the workbench. Subsequently, the respective sealing head is pushed onto each pipe and of the microcables and is fixed in a sealing manner over the entire periphery by crimping. For further assembly, one of the microcable fastenings is then removed and the closure pipe is pushed with the aid of a guide over the splices until the second sealing head is taken up by the closure pipe. The required excess length of optical waveguide within the closure is then achieved by displacing at least one closure head. For this purpose, the fastenings of the pipe ends of the microcables have to be displaced. Thereafter, both ends of the closure pipe are crimped by a crimping device, for example crimping pliers, radially onto the sealing heads. All the operations in the assembly device are provided with longitudinal stops, or at least visual markings, for reasons of better reproducibility.

Dividing optical waveguides between different branching cables can be achieved with specially designed sealing heads which are provided with a plurality of cable lead-throughs. The fixing and sealing at these cable lead-throughs, which takes place with cable lead-in spigots, is performed outside the cable closure by crimping. Alternatively, it is possible to dispense with crimping between the closure pipe and the closure head if, instead, the two parts are screwed to each other or fixed in a sealing manner by a shrink tube.

If required, the interior space in the cable closure may also be filled with filling compound. For this purpose, the closure pipe is provided with filling holes, which are closed for example by clamping rings or by a hot- or cold-shrink tube.

Thus, with a structural design according to the invention, the following advantages are obtained in comparison with the existing prior art.

It is a slender, no longer openable cable closure of plastically deformable metal.

The closure is stable with respect to transverse compressive stress, tension-resistant, torsionally rigid and pressure-watertight.

Assembly of the cable closure, comprising few individual parts, is quick and easy.

The metallic seals are pressure-watertight seals which are resistant to temperature and aging at the same time.

The sealing does not involve any plastic or rubber seals, so that no flowing of materials occurs.

Only a few, annular and concentric seals with a large sealing surface area are used.

There are no longitudinal seals.

A permanent, pressure-watertight optical-fibre cable/ sealing head connection which is stable with respect to tensile, compressive and torsional forces is produced by crimping.

A permanent, pressure-watertight sealing head/closure pipe connection is produced by crimping.

The sealing heads consist, for example, of plastically deformable metal, for example copper, aluminium.

Simple standard crimping pliers which have appropriate inserts and carry out the deformation plastically are adequate for the crimping operation.

A plurality of crimpings in series one behind the other increase the sealtightness and pull-out force of the microcable ends.

The sealing effect can be increased by peripheral grooves on the sealing head.

On account of the small diameter, the cable closure may be laid in the axial direction of the microcables, so that a widening of the laying channel is adequate, the laying depth of the microcable likewise being adequate.

The metallic closure pipe and the metallic sealing heads provide electrical through-connection of the microcable.

The crimping of ductile copper microcables and of hard, resilient steel tubes is possible.

The cable closure in resistant to buckling and, consequently ensures that optical waveguide bending radii are maintained during laying.

The sealing heads of the cable closure of different internal diameter are interchangeable, but have the same external diameters.

The closure heads have in the longitudinal bore a length stop for the microcable, so that penetration of the microcable into the interior of the cable closure is prevented. The bores of the closure heads are bevelled and facilitate assembly during leading in of the microcables.

This structural design provides a standard size of closure for all diameters of possible microcables.

Due to the interchangeability of the sealing heads, connecting microcables of different external diameters is also possible.

Microcables with a low number of optical waveguides and with a high number of optical waveguides can be spliced with one another.

A shrink splice protector allows a plurality of optical-fibre splices to be protected.

Both individual optical waveguides and optical waveguide strips can be accommodated in the closure.

Depending on the width of the closure pipe, the optical-fibre splices can be arranged in series one behind the other or else next to one another.

Standard tools can be used for the splicing, such as a splice protector and thermal splicer for optical waveguides.

The length of the closure allows excess lengths of optical waveguide to be accommodated adequately on both sides of the optical-fibre splices.

The optical-fibre splices are freely movable within the cable closure.

The following can be used, for example, as deformable materials: copper, copper-based wrought alloys, aluminium, cold-workable aluminium alloys or plastically deformable, non-hardened, stainless steel.

Furthermore, the sealing between the sealing-head outer casing and the closure pipe and/or between the sealing-head bore and the pipe end of the microcable may alternatively also take place by a cutting-clamping connection, as is known perese from sanitary installation engineering. The cutting rings used for this purpose are plastically deformed by union nuts and thereby seal off the concentric, tubular closure parts from one another. For this purpose, however, internal and external threads have to be provided an corresponding sealing heads.

In FIG. 22, a slender cable closure KM is represented in longitudinal section as an in-line closure for two microcables MK1 and MK2 with protective splices SS lying in series one behind the other in the interior of the cable closure KM. A plurality of individual optical-fibre splices are brought together and protected together in a multiple splice protector SS. On both sides of the protective splices SS there is adequate free pipe length in order to accommodate the excess length of optical waveguide LU1 and LU2, respectively. The protective splices SS are freely movable within the cable closure KM. The ends of the pipes of the microcables MK1 and MK2 are fixed in a sealtight manner by crimping at the crimping points KRK of the two sealing heads DK1 and DK2, the required tensional, torsional and compressive strength being achieved at the same time. The closure pipe MR1 pushed over the two sealing heads is crimped onto the two sealing heads DK1 and DK2 and closed in a pressure-watertight manner on both sides at the crimping points KRM. The individual optical waveguides are fixed with the aid of fixings F in the region of the protective splices to the latter in order to facilitate the assembly of the closure pipe MR1. In this case, the ends MKE1 and MKE2 of the pipes of the microcables MK1 and MK2, respectively, are led through the respective sealing head DK1 or DK2 into the interior of the closure.

Represented in FIG. 23 is a sealing head DK, which has an inner bore BDK, the diameter of which is matched to the microcable to be respectively fed in. At the inner end of this bore BDK there is a stop AS for the led-in cable. At the inlet of the bore BDK, the edge of the bore is provided with a bevel AF, in order to facilitate the leading in of the microcable. On the outer surface of the sealing head DK, peripheral sealing grooves may be arranged, by which the sealing effect is improved.

FIG. 24 shows a cross-section through the cable closure in the splice region of the closure pipe MR1. Within a protective splice SS, of which a plurality are arranged in series one behind the other in this exemplary embodiment, there are a plurality of optical waveguide splices LS, which are fixed next to one another. Such a splice protector is, finally, also provided with a fixing F, by which the excess lengths of optical waveguide LU led past the splice 55 are loosely held in the closure space.

FIG. 25 illustrates that a plurality of splice protection units SS, with the optical-fibre splices LS contained therein, may be arranged next to one another, although then the cross-section of the closure pipe MR2 has to be greater than in the case of the exemplary embodiment according to FIG. 22.

In FIG. 26, the cable closure KM is designed as a branch cable closure, two sealing heads DK3 and DK4 are used and the closure pipe MR2 is crimped in a secure and sealtight manner at the crimping points onto the heads DK3 and DK4. In the case of this exemplary embodiment, there are additionally provided filling openings EF, which can be closed with the aid of sealing tapes DB. Arranged in the sealing heads DK3 and DK4 are cable lead-in spigots KES1 to KES4, which correspond to the sealing heads DK1 and DK2 of the previously described in-line cable closure, that is to say they too are of plastically deformable material and serve for the sealtight connection of the microcables MK3 to MK6. At the crimping points KRK of the cable lead-in spigots KES1–KES4, inserted into the lead-in bores EB of the sealing head DK3 and DK4, respectively, the mechanical supporting and sealing off of the led-in microcables MK3–MK6 takes place. Contained in the interior of the cable closure are the protective splices BS, in which the individual optical-fibre splices are accommodated in groups.

FIG. 27 finally shows an assembly arrangement for the assembly of the cable closure according to the invention once the
splicing work has bean carried out with the aid of a splicer SPG. On both sides of the splicer SPG there are removable fixings FMK1 and FMK2, respectively, for the fixing of the respective microcables MK1 and MR2 to be connected. The sealing heads DK1 and DK2 of the cable closure to be assembled are pushed onto the ends of the microcables MK1 and MK2, respectively, and fixed by crimping. Beforehand, however, the closure pipe MK1 has been pushed over the microcable MK1 and fixed. Once the splicing work with the aid of the splicer SPG has then been completed, the fixing FMK1 at the sealing head DK1 is released and removed. As a result, the closure pipe MR1 previously pushed on and fixed for assembly can be pushed in the direction of the indicated arrow PFMR over the two sealing bodies DK1 and DK2. By corresponding displacement of the sealing bodies DK1 and DK2, respectively, the excess lengths LU1 and LU2 contained in the interior can then be formed. Subsequently, the closure pipe MR1 is fixed in a sealing manner onto the sealing heads DK1 and DK2 by crimping.

The invention relates to a method of connecting a microcable comprising a pipe with led-in optical waveguides, which has been introduced into a laying channel in solid laying ground, to an existing optical-fibre transmission system of a conventional type.

Optical-fibre transmission systems comprising optical-fibre cables known perese are sufficiently known and already laid, subsections being coupled together by the conventional connection units. However, the optical-fibre transmission system comprising tubular microcables, which comprise homogeneous and pressure-watertight pipes into which optical waveguides are introduced, cannot be connected in the previously customary way to an existing optical waveguide system, since the microcables differ considerably in structural design and in the type of laying from the conventional optical-fibre cables.

Furthermore, it is the object of a development of the invention to find methods of connecting a microcable with the aid of cable closures of the type described to conventional optical-fibre transmission systems, it being intended for the connection to take place in the same laying ground or in laying grounds of different types of construction. The object set is then achieved with the aid of a method of the type explained at the beginning, when joining together in the same laying ground with cable closures, by the microcable being led into an adapter closure, for receiving microcables, through a cable lead-in of a manhole of the existing optical-fibre transmission system which has been made in the same laying ground, by optical waveguides of a flexible cross-connecting cable being spliced onto the optical waveguides of the microcable within the adapter closure and by the cross-connecting cable being led into a conventional splicing closure for optical waveguides for connection to the optical cables of the existing optical-fibre transmission system, the joining together being performed within the splicing closure.

Furthermore, the object set is also achieved with the aid of a method of the type explained at the beginning, when joining together in different laying grounds, by the microcable being led at the end of the solid laying ground into an adapter closure at the height of the laying channel and spliced onto a buried cable, by the buried cable being laid in the earth at the height of the leading-in level of the manhole made in the earth, led into the manhole and spliced there within a splicing closure onto the existing optical-fibre network.

With the aid of the method according to the development of the invention, it is then possible to couple an optical-fibre transmission system made up of microcables to an optical-fibre transmission system with conventional optical-fibre cables. The coupling of tubular microcables
onto the existing network in this case takes place with cable closures of which the cable lead-ins are designed for the requirements of the microcables. Used for this purpose are cable closures of metal of which the spigot-shaped cable inlets are crimped onto the pipes of the microcables. This method in not possible with the aid of conventional cable closures. From such an adapter closure, a cross-connecting cable of a conventional type is then led to a conventional splicing closure, into which the conventional optical-fibre cables are also led in. There, the splicing of the optical waveguides of the microcable, or of the cross-connecting cable, with the optical waveguides of the conventional optical cables is performed. This has the advantage that the tubular microcable ends in a special adapter closure, from which a flexible optical-fibre cable in led into a conventional splicing closure, where any service work can then be performed. In this case, the microcable, which is susceptible to buckling, can be rigidly fixed on the manhole wall, so that any buckling of the pipe can be ruled out. In the conventional splicing closure, on the other hand, cross-connecting excess lengths of fibres for subsequent splicing and all the splices can be accommodated. In the adapter closure itself, only the microcable is accommodated and connected to the flexible cross-connecting cable.

If a special adapter closure cannot be used, the microcable must be led directly into the splicing closure by special measures, corresponding protective measures having to be taken for the pipe which is susceptible to buckling. Suitable for this purpose is, for example, a tube which is stable with respect to transverse compressive stress and protects the metal pipe of the microcable against buckling and damage. The protective tube also makes the microcable much thicker, so that it can be identified better in the manhole.

Access to an already existing manhole, in which optical cables of a conventional type have already been led in, is achieved by the laying channel in which the microcable is laid being cut into the solid laying ground in the direct vicinity of the manhole. The normal laying depth of such a route is 70 to 150 mm. From the road surface, a core hole is then made up to the route of the microcable on the outer wall of the manhole. Subsequently, the manhole wall is drilled through in the upper manhole region and the microcable in led in from outside. The core hole made outside the manhole in this came serves as a leading-in aid, to compensate for laying inaccuracies and for receiving the loop of excess length of cable of the microcable as well as for sealing off the manhole from the outside. The manhole is sealed off by a conventional masonry lead-through, such as for example with lead-through seals known peruse for manholes. In the interior of the manhole, the microcable is then led horizontally along the manhole wall up to the adapter closure.

If the manhole for the conventional optical-fibre systems is not made in the solid laying ground in which the microcable runs, difficulties arise in bringing the microcable up to the manhole; this is because the relatively rigid microcable could, for example, be sheared off. In such cases, there is then placed at the end of the laying channel in the solid laying ground, for example of a road surfacing, an adapter closure, into which the microcable is led. Here there is then spliced on a flexible buried cable, which in laid at a deeper laying level in the earth up to the leading in of the manhole. Here, the splicing onto the existing network then takes place in a splicing closure.

The leading into a manhole also open up the possibility that microcables laid at different heights can be brought together.

The following special features and advantages of the method are obtained according to the invention:

The customary optical waveguide assembly technique can be retained.

The bringing together of the new and old optical-fibre systems can take place in already conventional optical waveguide accessories.

The small laying depth of the microcable allows the existing free space in the upper manhole region also to be used.

A core hole on the outer wall of the manhole suffices for leading in the microcable, so that no excavation of the surrounding earth is necessary.

In such a way, routes having different laying heights can be brought together.

Figure 28:
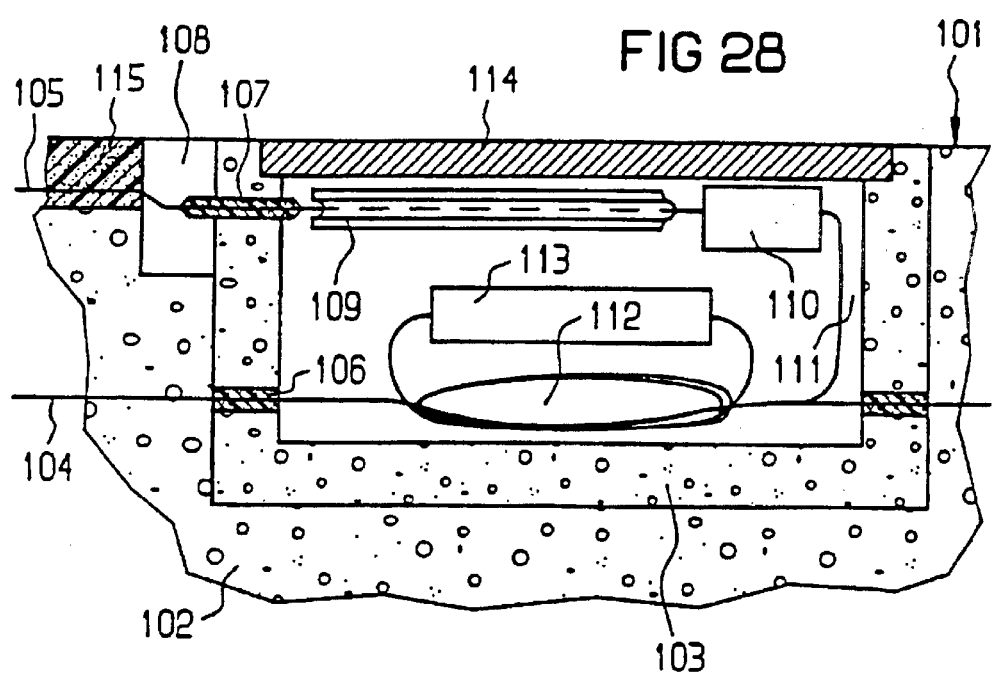
FIG. 28 is a cross-sectional view of an arrangement for bringing together of the different optical waveguide transmission systems.

The manhole 103 shown in FIG. 28, which is arranged below the road surface 101 of the laying ground 102 and is covered by a cover 114, contains first of all an optical-fibre transmission system 104 comprising conventional optical-fibre cables. Already provided in this system is a conventional splicing closure 113, excess lengths 112 of optical-fibre cable introduced in the customary way allowing a certain mobility of the splicing closure for splicing work. These optical cables of the conventional system 104 are usually in ducts and are led in via lead-in seals 106 relatively deep in the lower region of the manhole. By contrast, the newly added microcable 105, comprising a pipe and optical waveguides guided therein, in led into the manhole 103 via a cable lead-in 107 in the upper region of the manhole, since the laying channel has only a depth of 70 to 150 mm. For this purpose, a core hole 108 is introduced outside the manhole 103, in order to have sufficient free space for leading in the microcable.

Into this core hole 108 there may also be introduced, for example, a tubular excess length of the microcable 105, with which it is possible to compensate for tolerances in length. After introducing the microcable 105, the laying channel is filled with a filling compound 115, such as for example bitumen. Within the manhole 103, the led-in microcable 105 is initially mechanically protected and supported with the aid of a protective tube or protective pipe 109 and is subsequently led into an adapter closure 110, which in suitable for the leading in of microcables. In this adapter closure 110, the optical waveguides are connected to a flexible cross-connecting cable 111. After leaving the adapter closure 110, this flexible cross-connecting cable 111 is then led into the splicing closure 113 of the already existing optical-fibre transmission system and coupled to it via optical-fibre splices. The flexible cross-connecting cable 111 is also deposited in the manhole with corresponding excess lengths 112, so that, even after the cross-connecting cable has been led in, removal of the splicing closure 113 from the shaft for service work is possible.

Figure 29:
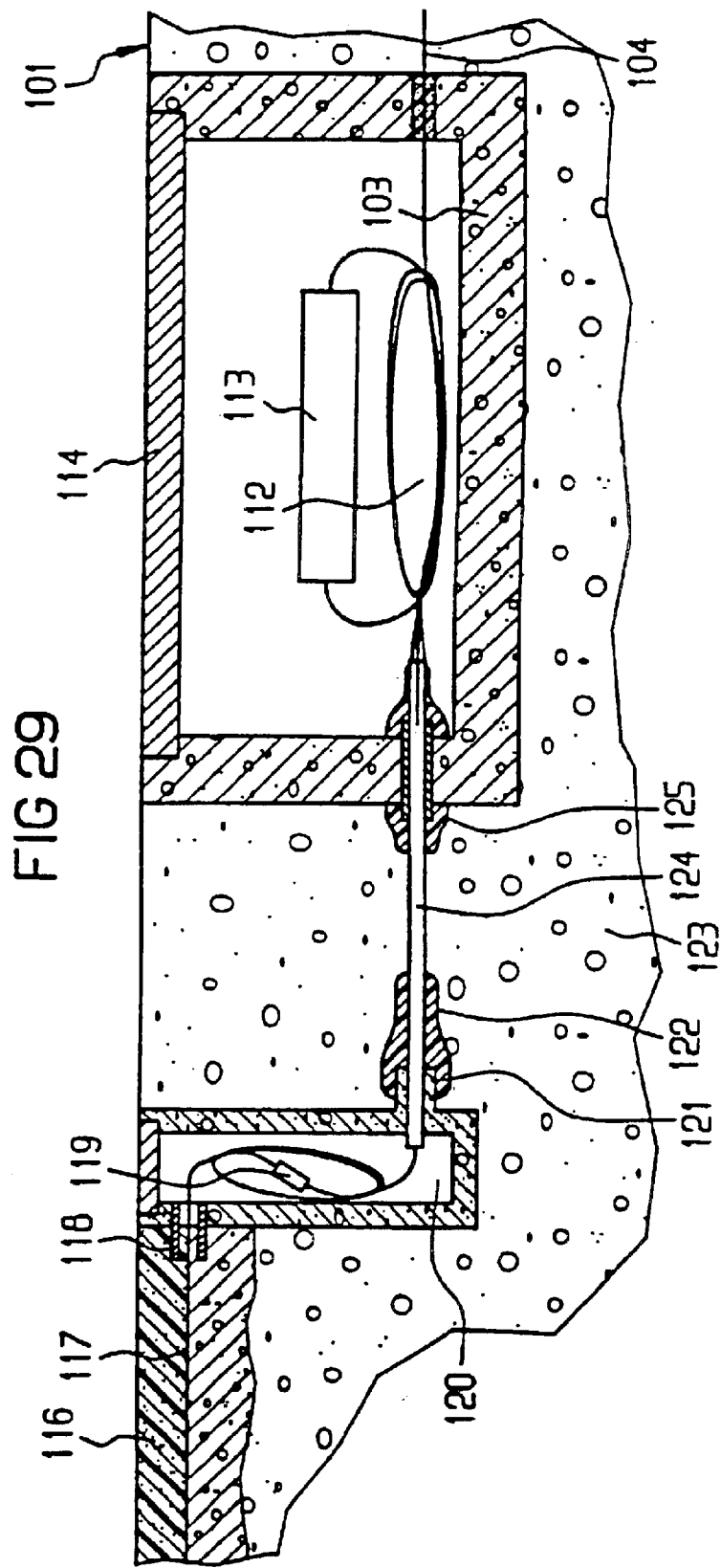
FIG. 29 is a cross-sectional view of an arrangement in a manhole in the free earth.

FIG. 29 shows an exemplary embodiment of the, procedure when the manhole is not in the region of the solid laying ground in which the microcable is laid, but is in the neighboring, relatively soft earth. The relatively rigid microcable could be damaged in the transitional region. Thus, if the manhole 103 is in the, earth 123, the microcable 117 can be laid only up to the end of the solid laying ground, for example the carriageway 116. Prom there, a buried cable 124 has to be led to the cable lead-through 125 of the manhole. The standard laying depth is about 60 to 70 cm in the earth. The difference in height can be overcome with an adapter closure 120. The microcable 117 is led in and sealed off in the upper region by the lead-in 118. The buried cable 124 is led through a spigot 121 and sealed off, for example by a shrink tube piece 122. For leading into the manhole 103, the buried cable 124 has to be buried in the ground and the out rewall of the manhole 103 has to be exposed. Within the manhole 103, the buried cable in then led into the splicing closure installed there, where the optical waveguides are connected.

During the laying of microcables, which comprise a pipe and optical waveguides loosely introduced therein, it is necessary to arrange excess lengths of cable before branches, closures or after relatively long sections of cable, in order to make required compensations of lengths possible. Such settlements, elongations and also temperature-induced changes in length during the interaction of materials with different coefficients of thermal expansion are compensated by so-called elongation loops. During laying in laying channels which are made in solid laying ground, these elongation loops have until now been made vertically in correspondingly sunken laying channels, perpendicularly with respect to the surface of the laying ground. This leads to difficulties, however, if the laying ground, such as for example a carriageway surfacing, is not sufficiently thick.

A further object of the invention is thus to provide a protective device for terminating core holes in which the elongation loops of microcables are horizontally laid. The object set is achieved with a protective device of the type explained at the beginning by the said device comprising a protective cover and a driving-in peg, provided centrally at one end, for fixing in a central hole at the bottom of the core hole, by the diameter of the protective cover corresponding to the diameter of the core hole and by filling material being arranged above the protective cover for sealtight termination and for filling the remaining core hole.

The advantage of protective devices according to the invention is that elongation loops of microcables can be horizontally laid reformed into core holes which have a diameter which corresponds at least to the minimum permissible bending radius of a microcable, since the possible mechanical loading is absorbed by it and since such a termination also has the necessary sealtightness. Furthermore, it is of advantage that now the core holes are only required to be of a small depth, so that breaking through the solid laying ground, such as for example the subgrade of a carriageway, can no longer occur. Such an intervention to the mechanics of the solid laying ground, for example a road surfacing, is consequently uncritical. The required diameter for such a core hole is of the order of magnitude of 150 mm, so that these core holes can still be made with conventional machine tools without any problem. Consequently, the same tool can be used to produce core holes for elongation loops, cable branches or setting holes for cylindrical cable closures, as are customary in the use of microcables.

The protective device according to the invention comprises a more or less mushroom-shaped mounting, which is inserted into the core hole of the solid laying ground and upwardly covers the latter such that the original strength of the laying ground, for example the surfacing for road traffic, is restored. Within the core hole, the coiled-up excess length or elongation loop of the microcable in held down. In addition, the core hole is sealed off with respect to the surface of the solid laying ground and the microcable is protected against mechanical loading from above. This problem in particularly important if, due to elevated climatic conditions, for example in the case of a temperature rise above 30° C., the bitumen of the road surfacing softens and the mechanical load-bearing capability is reduced. For example, in high summer, even in our temperate zones, temperatures of over 60° C. are measured in the asphalt. The hollow space of the core hole, in which the elongation loop is located, may be filled with a filling material, which must not, however, restrict the, mobility of the microcable. The protective device upwardly terminates the core hole and the region there above is sealed with hot bitumen. Additions of solid material such as chippings increase the strength of the cast bitumen, so that in this way something approaching the strength of the asphalt is achieved.

Figure 30:
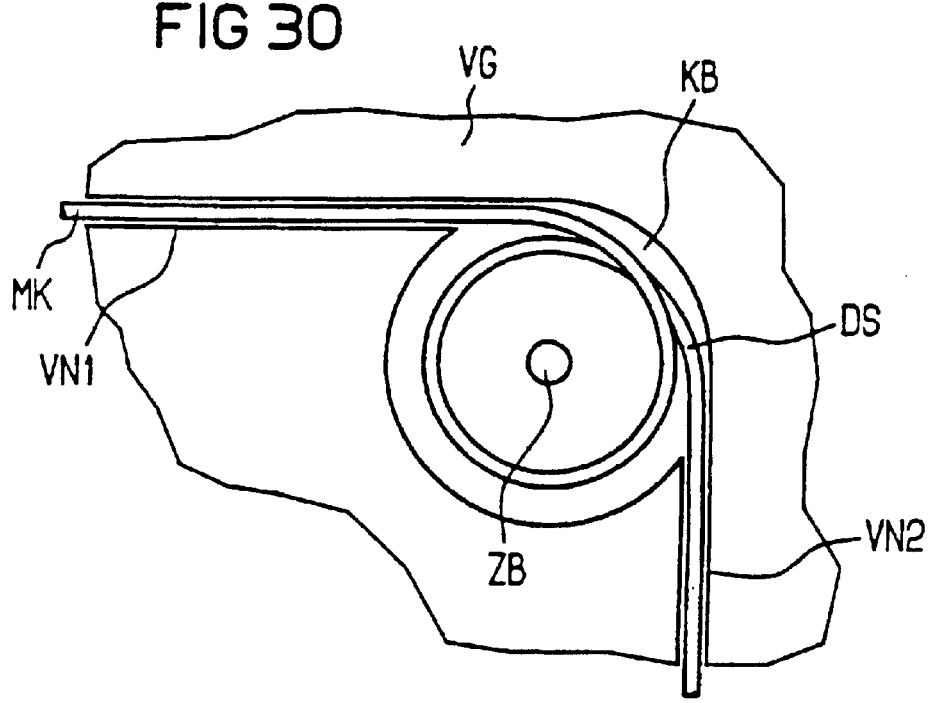
FIG. 30 is a plan view of an open core hole with a laid-in elongation loop of a microcable.

Represented in FIG. 30 is, a core hole RB in solid laying ground VG, in which two laying channels VN1 and VN2 run in tangentially. The core hole KB has a diameter which is adequate for receiving the excess length or elongation loop DS of a microcable MK in a horizontal position for the range of elongation to be expected. A central hole ZB serves for receiving and arresting the protective device according to the invention. The hollow space of the core hole KB may, if required, be filled with a filler, which must not, however, significantly influence the mobility of the elongation loop DS. The laying channels may be led into the core hole at different angles of offset, so that virtually any angling off can be carried out for the further running of a laying route. In addition to the central hole ZB, further holes may be made in the laying ground, serving for example as an outflow for condensed water in the core hole KR or one of the laying channels VN1 or VN2. When laying in the elongation loop DS, it must be ensured that the microcable MK does not touch the wall of the core hole, so that during any elongation the laid-in microcable can also give way outwards. Consequently, compressive stresses in the microcable are reduced without compression occurring and without risking buckling. When shortening the microcable, the elongation loop may be pulled together without the cable being subjected to tensile stress. In this figure, a deflection of the microcable MK of 90° is shown and the excess length or elongation loop DS is then stored in a 450° loop. Such an arrangement may be used in respective of the inlet or outlet angles for deflecting a route or else as an ancillary means ahead of a following cable closure.

Figure 31:
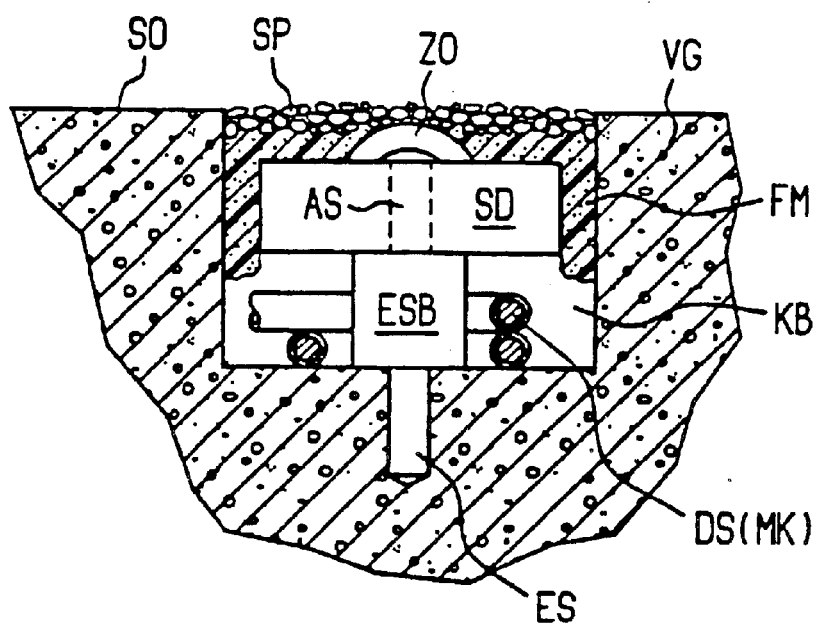
FIG. 31 is a cross-sectional view of the inserted protective device.

FIG. 31 shows in a sectional representation through the core hole KB the position of the elongation loop DS of a microcable MK and the mushroom-shaped protective device, which comprises the protective cover SD and a driving-in peg ES, which has, for example, in the region of the elongation loop DS a minimum diameter limitation ESB of a diameter which corresponds to the minimum permissible bending radius of the led-in cable MK. In this way, there is no risk that the microcable MK could be excessively beat or buckled. The free space above the protective cover SD is filled with a filler FM, preferably a hot bitumen, whereby a sealing of the core hole KB takes place. If hot bitumen is used, a mixture with chippings SP is expedient, since in this way an adaptation to the road surfacing SO can be achieved. Furthermore, it is shown in this FIG. 31 that a pulling eyelet ZO may be provided for lifting the protective cover SD. The protective device according to the invention may, however, also be of a multipart configuration, the driving-in peg ES then expediently having in the upward direction a receiving pin AS, onto which the protective cover SD can be placed or screwed. The diameter limitation ESB lying thereunder in this case form a peripheral rest for the protective cover SD. The diameter limitation ESB may also be fitted on as an extra part in the form of a sleeve. With the driving-in peg ES, the entire device is fixed in a central hole in the laying ground within the core hole KB by driving in.

To sum up, further special advantages of the protective device are listed:

It is a temperature-independent protective device for core holes, since the protective cover compensates for the differences in heat in the asphalt and dissipates the heat via the peg into the earth. As a result, there is also no settling or flowing of the asphalt above the protective cover.

The elongation loop of the microcable can move freely underneath the protective cover, to be precise even if loose fillers, such as stone chips, bitumen, prefabricated profiles of polystyrene or one-component foam, are filled in. Consequently, the hollow space is largely protected against the formation of condensed water, since a seepage of any condensed water occurring is also ensured by additional holes in the core hole, which reach into the frost blanket of the laying ground.

The protective cover absorbs the loading from above and directs it via the driving-in peg into the solid laying ground. As a result, high permanent loading is possible without subsidence. The same applies in the case of high area loading or else in the case of puncti-form loading, as may be caused by tyres of vehicles or by sharp objects such as props, tools, chisels, knives, pins or stiletto heels.

If a large elongation length is required, a correspondingly large core hole may be made, it being possible for the radii of the elongation loops to be formed simply and without a tool. Buckling is in this case scarcely possible.

The surface of the protective cover may be roughened, in order that better adhesion with respect to the cast material is achieved.

It is also ensured by the protective cover that the elongation loop does not spill out or move out upwards when an elongation operation is proceeding.

The filling of the hollow space of the core hole above the protective cover ensures that, when the road surfacing to renewed, only the filler above the protective cover is cut away and renewed, so that the protective device remains unaffected by this.

A further object of the invention is to provide a cable closure for optical waveguides which is fitted in solid laying ground, is accessible from above and has leading-in possibilities for deeply laid cables. The set of objects is then achieved with the aid of a cable closure of the type explained at the beginning, by the cable closure comprising an outer body which can withstand high mechanical loads and a cable-closure sealing body fitted in the outer body, by the outer body having a removable outer cover, which is at the same height as the surface of the laying ground, by the cable-closure sealing body lying thereunder being closed off by an upwardly removable sealing cover, by cable connection units in pipe form being led in from below through the outer body into the cable-closure sealing body and by the ends of the cables being led into these cable connection units and sealed off.

The cable closure according to the invention is an upwardly accessible closure, making it possible for splicing and cross-connecting work and also lining up of fibres or twin copper wires to be performed without exposing the closure. Until now, fibres and twin copper wires of local and connecting cables have been accessible only if the entire closure is exposed and the closure body is removed. At the same time, the closures are usually at the same laying height as the cables. Digging work is, however, usually laborious, so that much time is additionally taken up for the repair and service work to be carried out. In the case of the work to be performed according to the invention, there is no need for digging work, since the upper side of the closure terminates flush with the surface of the laying ground. Such a closure is suitable in particular for leading in microcables, which are arranged at a relatively small depth in laying channels of solid laying ground. In addition, in the case of the cable closure according to the invention, there is also the possibility of leading in standard buried cables, which usually run at a greater laying depth. Provided for this purpose arm cable connection units, which are led into the cable closure from below, the leading-in height of these cable connection units being adapted to the laying height of the buried cables. In this way, even deeper laid buried cables can be reached from the surface of the laying ground without special measures, such as digging work, being necessary.

Such cable closures may be used as branch cable, closures and/or in-line cable closures in local and branching networks. This is particularly favourable, since switching and cross-connecting work is recurrently necessary in the local network. On account of the simple structural design of the cable closure according to the invention, it may be used in an uncomplicated way in footpaths, pavements and cycle paths, in particular in urban areas. All that is required for this purpose are paved squares, roads or paths, the load-withstanding cover simply having to be removed for access to the cable closure, in order to gain access to the fibres or twin wires from the surface. If the cable closure according to the invention is used, special advantages with respect to systematic utilization of the existing infrastructure are then obtained on account of the compact structural design and the good accessibility.

In the configuration according to the invention, the mechanical loads are absorbed by the outer body, which preferably consists of grey cast iron, while the cable-closure sealing body in the interior of this outer body can be closed in a sealtight manner and contains the individual communication parts. The sealing cover and the outer cover are expediently secured against unauthorized opening and, if appropriate, can be locked. Overall, the outer body can withstand high mechanical loads up to a bridge class of 30 and more, so that the cabs-closure sealing body has to meet only the conditions with respect to sealtightness. The hollow space between the outer body and the cable-closure sealing body may expediently be filled or plugged with a filler, so that the two bodies are connected to each other in a dirt- and watertight manner as a unit. The closure sealing body is pressure-watertight and can be sealed off well and consists of plastic, diecast materials or metal. For fastening, there is preferably provided a sealing cover, the fastening mechanism of which is designed as a turn-lock or bayonet fastener. Such a closure may also be built at a later time into existing routes of pavements and cycle paths, since the design means that it can fit in well with the local conditions. The structural design of the cable closure also allows further cables to be led in at a in later time if cable connection units were additionally provided at the beginning. For easy identification, the cable closure can, because of its easy accessibility, be easily assigned by labelling or coding, so that there is no need for laborious search and coordination measures.

FIG. 32 shows the upwardly accessible cable closure KMO according to the invention, which comprises the outer body AK, which can withstand high mechanical loading, and the inner cable-closure sealing body KDK. The outer body AK terminates with respect to the laying ground VG below with a standing flange STF and upwardly with a peripheral collar KR. Fitted within the collar KR is the outer cover AD, which can be lifted up along a pivot pin DA and swung out to the side, so that the sealing cover DD of the cable-closure sealing body KDK lying thereunder is then accessible. This sealing cover DD seals off the cable-closure sealing body KDK via a round seal RD and with the aid of a fastener, preferably a bayonet fastener BV. The intermediate space between the outer body AK and the cable-closure sealing body KDK is filled here with a filler, for example a plastics foam FS. The cable-closure sealing body KDK is hold centrally in the outer body AK by a spacer AH and the supporting flange AF for the outer cover. The surface of the laying ground VG,
for example a road surface so, terminates flush with the surface of the outer cover AD, so that a steeples transition is ensured. Shown in the interior of the cable-closure sealing body KDK is a splice organizer SK, on which the led-in optical waveguides LWL are spliced. After opening the outer cover and sealing cover, this splice organizer SK is accessible from above, without the cable closure having to be removed. Because of the excess lengths of optical waveguide, the splice organizer SK can, however, be pulled out for service work. The cables K or else microcables MK are led in through the cable connection units KA1, KA2 and KA3 connected downwardly onto the cable closure KMO, these cable connection units KA1, KA2 and KA3 being angled off, or bent off, at the laying height of the cables K or MK, so that the leading in can take place without buckling. The sealing between the cable K and a cable connection unit. KA3 may be performed, for example, with the aid of a shrink tube piece SS. The sealing between a microcable MK and unit KA1, which comprises a pipe with introduced optical waveguides, takes place, for example, with the aid of a peripheral crimp connection KV.

In the case of this cable closure according to the invention, however, there may also be provided additional cable connection units from the side in the upper region of the side wall of the cable closure KMO, which units are then usually used for feeding in microcables lying less deep, as already described. However, this is not drawn in here. Such lead-ins may take place radially or tangentially.

Consequently, depending on the type of structural design and laying depth, cables can be brought together in a cable closure, all the cable ends and the associated terminations then being effortlessly accessible from above, without the cable closure itself having to be dug out.

If the static loading, for example in the footpath region, is only low, it is possible to dispense with the outer body. The removable
or pivotable outer cover is then provided directly on the closure sealing body.

What is claimed is:

1. An optical-fiber transmission system, comprising a cable closure body and fiber optic cables, said system further comprising:
    (a) cable lead-in spigots, said cable lead-in spigots being attached to said cable closure body and being in communication with an interior space of the closure body, said cable lead-in spigots having respective outer surfaces;
    (b) said fiber optic cables comprising waveguide-receiving pipes and optical waveguides, said waveguide-receiving pipes respectively having outer surfaces and at least one optical waveguide therein, said waveguide-receiving pipes being respectively associated with said lead-in spigots; and
    (c) said waveguide-receiving pipes being connected to said lead-in spigots by respective sealing connections, said waveguide-receiving pipes terminating at said sealing connection and being disposed exteriorly of said closure body interior space, and respective said waveguides passing said sealing connections and entering said closure body interior space, wherein said sealing connections comprise respective sleeves having respective interior surfaces, said interior surfaces fittingly contacting said respective outer surfaces of said lead-in spigots and said respective outer surfaces of said waveguide-receiving pipes.

2. The system of claim 1, said lead-in spigots comprising respective pipes, said waveguide-receiving pipes being respectively in sealing connection with the lead-in spigots pipes, said sealing connections thereby formed inhibiting or essentially preventing movement of the cable pipes with respect to the lead-in spigot pipes.

3. The system of claim 1, said lead-in spigots and said waveguide-receiving pipes having respective end sections, said respective end sections being in contact.

4. The system of claim 1, said interior space of said closure body comprising a base section, said base section having a domed shape.

5. The system of claim 1, said interior space being defined by a wall surface of the closure body, said wall surface comprising at least one ledge for supporting a waveguide tray.

6. An optical-fiber transmission system, comprising a cable closure body and a fiber optic cable, said system further comprising:
    (a) cable lead-in spigots, said cable lead-in spigots being attached to said cable closure body and being in communication with an interior space of the closure body, said lead-in spigots having a terminal end section;
    (b) said fiber optic cables comprising waveguide-receiving pipes and optical waveguides, said waveguide-receiving pipes respectively having at least one optical waveguide therein, said waveguide-receiving pipes being respectively associated with said lead-in spigots, said waveguide-receiving pipes having a terminal end section; and
    (c) said waveguide-receiving pipes being connected to said lead-in spigots by respective sealing connections, said waveguide-receiving pipes terminating at said sealing connection and being disposed exteriorly of said closure body interior space so that respective terminal end sections of the lead-in spigots and the waveguide-receiving pipes are in contact, and respective said waveguides passing said respective sealing connections and entering said closure body interior space.

7. The system of claim 6, said sealing connection comprising a welded, soldered, crimped, shrink tube, or bonded connection.

8. The system of claim 6, said interior space of said closure body comprising a base section, said base section having a domed shape.

9. The system of claim 6, said lead-in spigots comprising respective pipes, said waveguide-receiving pipes being respectively sealingly connected to the lead-in spigot pipes, said sealing connections thereby formed inhibiting movement of the cable pipes with respect to the lead-in spigots.

10. The system of claim 6, said interior space being defined by a wall surface of the closure body, said wall surface comprising at least one ledge for supporting a waveguide tray.

11. An optical-fiber transmission system, comprising a cable closure body and fiber optic cables, said system further comprising:
    (a) an interior space of said cable closure body, said interior space being at least partially defined by a wall surface of the closure body, said wall surface comprising at least one ledge for supporting a waveguide tray;
    (b) cable lead-in spigots, said cable lead-in spigots being attached to said cable closure body and being in communication with said interior space of the closure body;
    (c) said fiber optic cables comprising waveguide-receiving pipes and optical waveguides, said waveguide-receiving pipes respectively having at least one optical waveguide therein, said waveguide-receiving pipes being respectively associated with said lead-in spigots; and
    (d) said waveguide-receiving pipes being connected to said lead-in spigots by respective sealing connections, said waveguide-receiving pipes terminating at said sealing connection and being disposed exteriorly of said closure body interior space, and respective said waveguides passing said respective sealing connections and entering said closure body interior space.

12. The system or claim 11, said sealing connection comprising a welded, soldered, crimped, shrink tube, or bonded connection.

13. The system of claim 11, said interior space of said closure body comprising a base section, said base section having a dome shape.

14. The system of claim 11 said lead-in spigots comprising respective pipes, said waveguide-receiving pipes being respectively sealingly connected to the lead-in spigot pipes, said sealing connections thereby formed inhibiting movement of the cable pipes with respect to the lead-in spigots.

15. The system of claim 11, said lead-in spigots and said waveguide-receiving pipes having respective terminal end sections, said respective end sections being in contact.

* * * * *